United States Patent
Sung et al.

(10) Patent No.: US 10,096,323 B2
(45) Date of Patent: *Oct. 9, 2018

(54) FRAME ERROR CONCEALMENT METHOD AND APPARATUS AND DECODING METHOD AND APPARATUS USING THE SAME

(71) Applicant: Samsung Electronics Co., Ltd., Suwon-si (KR)

(72) Inventors: Ho-sang Sung, Yongin-si (KR); Kang-eun Lee, Yongin-si (KR); Jung-hoe Kim, Yongin-si (KR); Eun-mi Oh, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 57 days.

This patent is subject to a terminal disclaimer.

(21) Appl. No.: 15/240,342

(22) Filed: Aug. 18, 2016

(65) Prior Publication Data

US 2016/0358612 A1    Dec. 8, 2016

Related U.S. Application Data

(63) Continuation of application No. 14/272,643, filed on May 8, 2014, now Pat. No. 9,424,851, which is a (Continued)

(30) Foreign Application Priority Data

Nov. 28, 2006 (KR) .................. 10-2006-0118563

(51) Int. Cl.
*G06F 11/00* (2006.01)
*H04L 1/00* (2006.01)
(Continued)

(52) U.S. Cl.
CPC ............ *G10L 19/005* (2013.01); *G10L 19/07* (2013.01); *G10L 19/083* (2013.01); *G10L 19/167* (2013.01); *H04L 1/0045* (2013.01)

(58) Field of Classification Search
CPC ..... G10L 19/005; G10L 25/93; G10L 19/008; G10L 19/07; G10L 25/78; G10L 19/06;
(Continued)

(56) References Cited

U.S. PATENT DOCUMENTS 5,142,537 A    8/1992    Kutner et al.
5,502,713 A    3/1996    Lagerqvist et al.
(Continued)

FOREIGN PATENT DOCUMENTS

JP    09-146595    6/1997
JP    2004-508597   3/2004
(Continued)

OTHER PUBLICATIONS

Notice of Allowance dated May 14, 2015 in related U.S. Appl. No. 11/935,600.
(Continued)

*Primary Examiner* — Guerrier Merant
(74) *Attorney, Agent, or Firm* — Staas & Halsey LLP

(57) ABSTRACT

A frame error concealment method and apparatus and a decoding method and apparatus using the same. The frame error concealment method includes setting a concealment method to conceal an error based on one or more signal characteristics of an error frame having the error and concealing the error using the set concealment method.

20 Claims, 13 Drawing Sheets

Related U.S. Application Data continuation of application No. 11/935,600, filed on Nov. 6, 2007, now Pat. No. 8,843,798.

(51) Int. Cl.

| | |
|---|---|
| *G10L 19/005* | (2013.01) |
| *G10L 19/07* | (2013.01) |
| *G10L 19/083* | (2013.01) |
| *G10L 19/16* | (2013.01) |

(58) Field of Classification Search
CPC .... H04L 1/0061; H04L 1/0045; H03M 13/47; G11B 20/1809; G11B 20/1876; G05B 17/02; G06F 11/0751; G06F 11/0748; H04N 19/00781; H04N 19/00939; H04N 19/00763; H04N 5/945
See application file for complete search history.

(56) References Cited

U.S. PATENT DOCUMENTS

| | | | |
|---|---|---|---|
| 5,598,506 A | 1/1997 | Wigren et al. | |
| 5,673,210 A | 9/1997 | Etier | |
| 6,157,830 A | 12/2000 | Minde et al. | |
| 6,445,696 B1 | 9/2002 | Foodeei et al. | |
| 6,493,667 B1 | 12/2002 | de Souza et al. | |
| 6,584,104 B1 | 6/2003 | McGowan | |
| 6,775,649 B1 | 8/2004 | DeMartin | |
| 6,968,309 B1 | 11/2005 | Makinen et al. | |
| 7,308,366 B2 | 12/2007 | Han | |
| 7,349,823 B2 | 3/2008 | Whisnant et al. | |
| 7,809,556 B2 | 10/2010 | Goto et al. | |
| 8,843,798 B2* | 9/2014 | Sung .................... | H04L 1/0045 714/747 |
| 9,424,851 B2* | 8/2016 | Sung .................... | G10L 19/005 |
| 2002/0002456 A1 | 1/2002 | Vainio et al. | |
| 2002/0091523 A1 | 7/2002 | Makinen et al. | |
| 2002/0109787 A1 | 8/2002 | Moni et al. | |
| 2003/0036382 A1 | 2/2003 | Chen | |
| 2003/0078773 A1 | 4/2003 | Thyssen | |
| 2003/0078774 A1 | 4/2003 | Thyssen | |
| 2003/0083865 A1 | 5/2003 | Thyssen | |
| 2005/0154584 A1 | 7/2005 | Jelinek et al. | |
| 2006/0222172 A1 | 10/2006 | Chhetri et al. | |
| 2007/0027683 A1 | 2/2007 | Sung et al. | |
| 2007/0198254 A1 | 8/2007 | Goto et al. | |
| 2007/0220340 A1 | 9/2007 | Whisnant et al. | |
| 2007/0239462 A1 | 10/2007 | Makinen et al. | |
| 2007/0265837 A1 | 11/2007 | Ehara | |
| 2007/0291836 A1 | 12/2007 | Shi et al. | |
| 2009/0177464 A1 | 7/2009 | Gao et al. | |
| 2010/0070271 A1 | 3/2010 | Kovesi et al. | |
| 2011/0125505 A1 | 5/2011 | Vaillancourt et al. | |

FOREIGN PATENT DOCUMENTS

| | | |
|---|---|---|
| JP | 2004-206132 | 7/2004 |
| JP | 2004-522178 | 7/2004 |
| JP | 2004-361731 | 12/2004 |
| JP | 5607365 | 9/2014 |
| KR | 2005-89457 | 9/2005 |
| KR | 1020070013883 | 1/2007 |
| WO | 02/35520 | 5/2002 |
| WO | 2005086138 | 9/2005 |
| WO | 2006028009 | 3/2006 |
| WO | 2008-066264 | 6/2008 |

OTHER PUBLICATIONS

Notice of Allowance dated Dec. 16, 2013 in related U.S. Appl. No. 11/935,600.
U.S. Office Action dated Jul. 22, 2013 in related U.S. Appl. No. 11/935,600.
U.S. Office Action dated Feb. 7, 2013 in related U.S. Appl. No. 11/935,600.
U.S. Office Action dated Jul. 5, 2012 in related U.S. Appl. No. 11/935,600.
U.S. Office Action dated Dec. 27, 2011 in related U.S. Appl. No. 11/935,600.
U.S. Office Action dated Jun. 23, 2011 in related U.S. Appl. No. 11/935,600.
U.S. Notice of Allowance dated Apr. 25, 2016 in U.S. Appl. No. 14/272,643.
U.S. Office Action dated Oct. 8, 2015 in U.S. Appl. No. 14/272,643.
U.S. Office Action dated Jun. 1, 2015 in U.S. Appl. No. 14/272,643.
U.S. Notice of Allowance dated Jan. 28, 2015 in U.S. Appl. No. 14/272,643.
U.S. Office Action dated Sep. 24, 2014 in U.S. Appl. No. 14/272,643.
Christian Hoene, Ian Marsh, Gunter Schafer, Adam Wolisz, Error Propagation After Concealing a Lost Speech Frame, Jun. 2006, pp. 7-12.
Office Action issued in Japanese Application No. 2009-539176 dated Jan. 14, 2014.
Japanese Office Action dated Jan. 4, 2012 in JP Patent Application No. 2009-539176.
Extended European Search Report dated Mar. 27, 2012 in EP Patent Application No. 12153285.7.
Extended European Search Report dated Mar. 27, 2012 in EP Patent Application No. 12153291.5.
Extended European Search Report dated Mar. 27, 2012 in EP Patent Application No. 12153234.5.
Extended European Search Report dated Mar. 23, 2012 in EP Patent Application No. 12153265.9.
Japanese Office Action dated Sep. 15, 2015 in corresponding Japanese Patent Application 2014-100896.
Jonas Lindblom et al: "Packet Loss Concealment Based on Sinusoidal Extrapolation", 2002 IEEE International Conference on Acoustics, Speech, and Signal Processing. Proceedings. (ICASSP), Orlando, FL, May 13-17, 2002;7 [IEEE International Conference on Acoustics, Speech, and Signal Processing (ICASSP)], New York, NY: IEEE, US, May 13, 2002 (May 13, 2002), pp. 1-173, XP032014760, DOI: 10.1109/ICASSP.2002.5743682, ISBN: 978-0-7803-7402-7,p. 174, right-hand column, line 5, p. 175, right-hand column, line 7.
Extended European Search Report dated Jun. 28, 2012 issued in EP Patent Application No. 12153304.6.
Japanese Office Action dated Oct. 23, 2012 issued in JP Application No. 2009-539176.
Korean Office Action dated Dec. 18, 2007 issued in KR 2006-118563.
International Search Report dated Feb. 11, 2008 issued in PCT/KR 2007-5692.
European Search Report dated Dec. 29, 2010 in EP Application No. 07833999.1.
Communication issued EP Application No. 12153291.5 dated Mar. 18, 2013.
Communication issued EP Application No. 12153285.7 dated Mar. 18, 2013.
Japanese Office Action dated Jul. 9, 2013 issued in JP Application No. 2009-539176.
U.S. Appl. No. 14/272,643, filed May 8, 2007, Ho-sang Sung, Samsung Electronics Co., Ltd.
U.S. Appl. No. 11/935,600 (now U.S. Pat. No. 8,843,798), filed Nov. 6, 2007, Ho-sang Sung, Samsung Electronics Co., Ltd.
Japanese Office Action dated Feb. 27, 2018 in Japanese Patent Application No. 2017-000620.

* cited by examiner

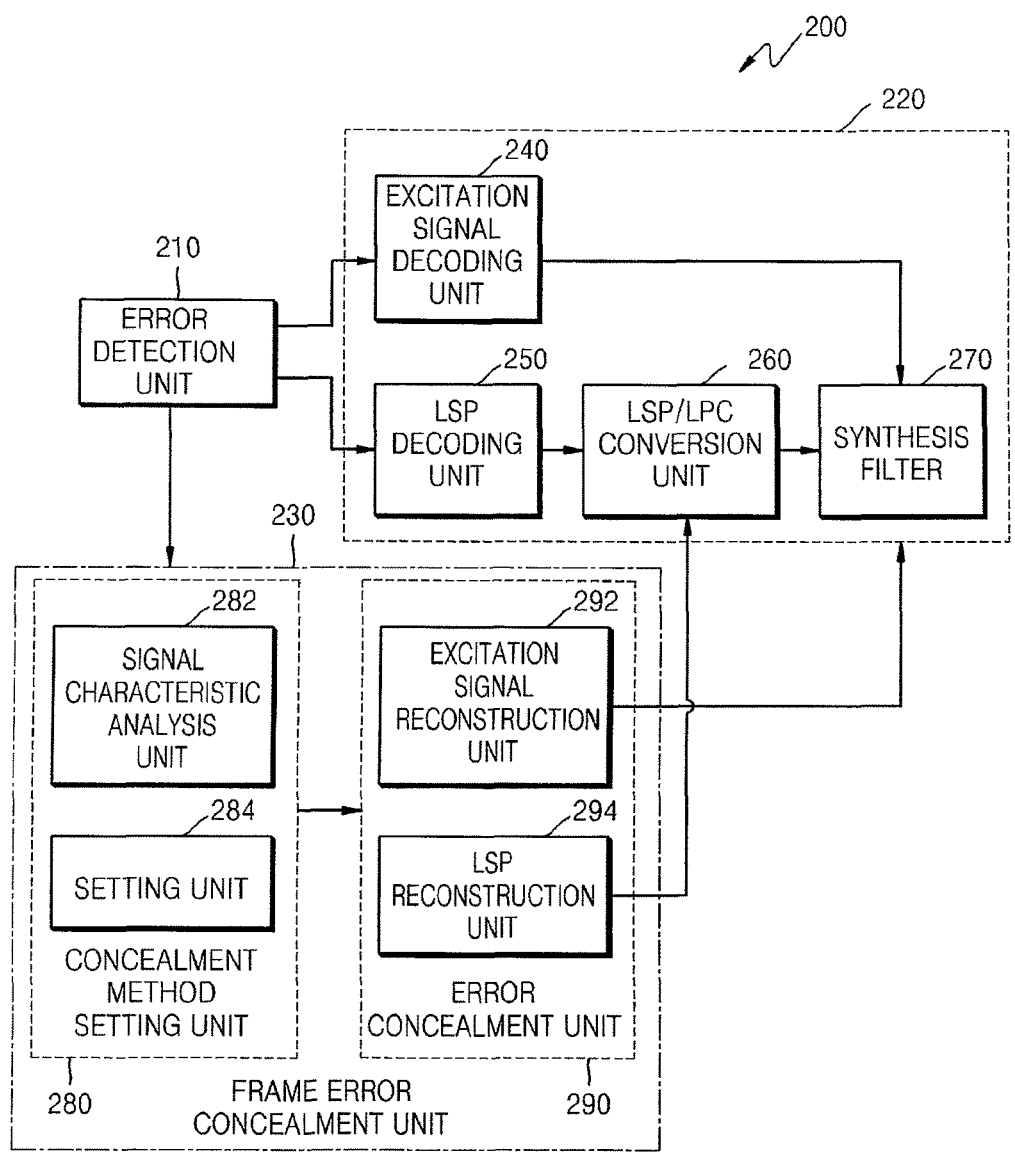

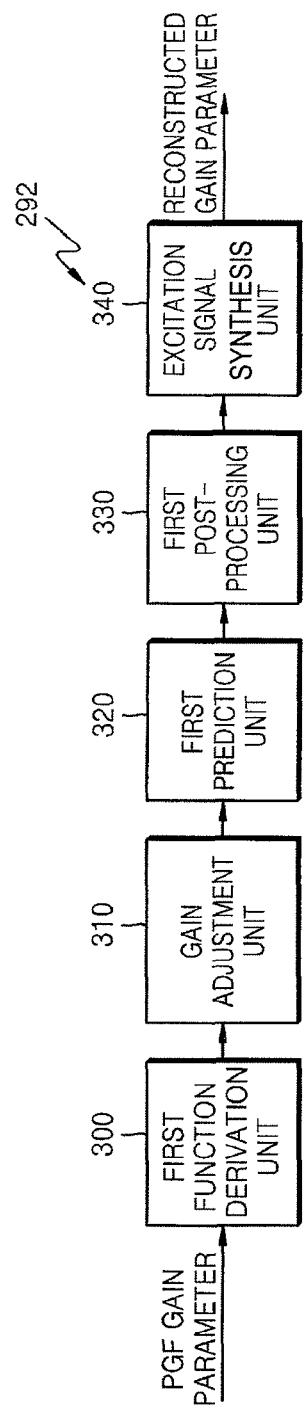
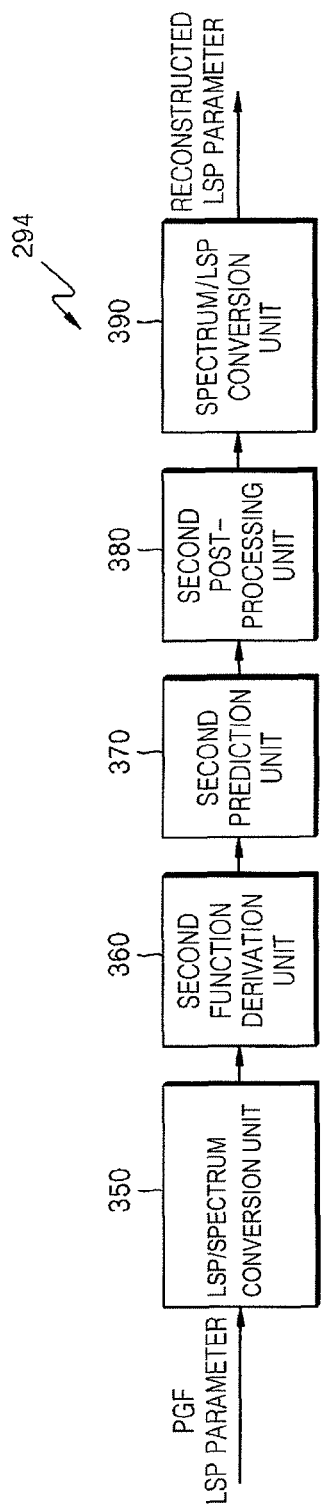

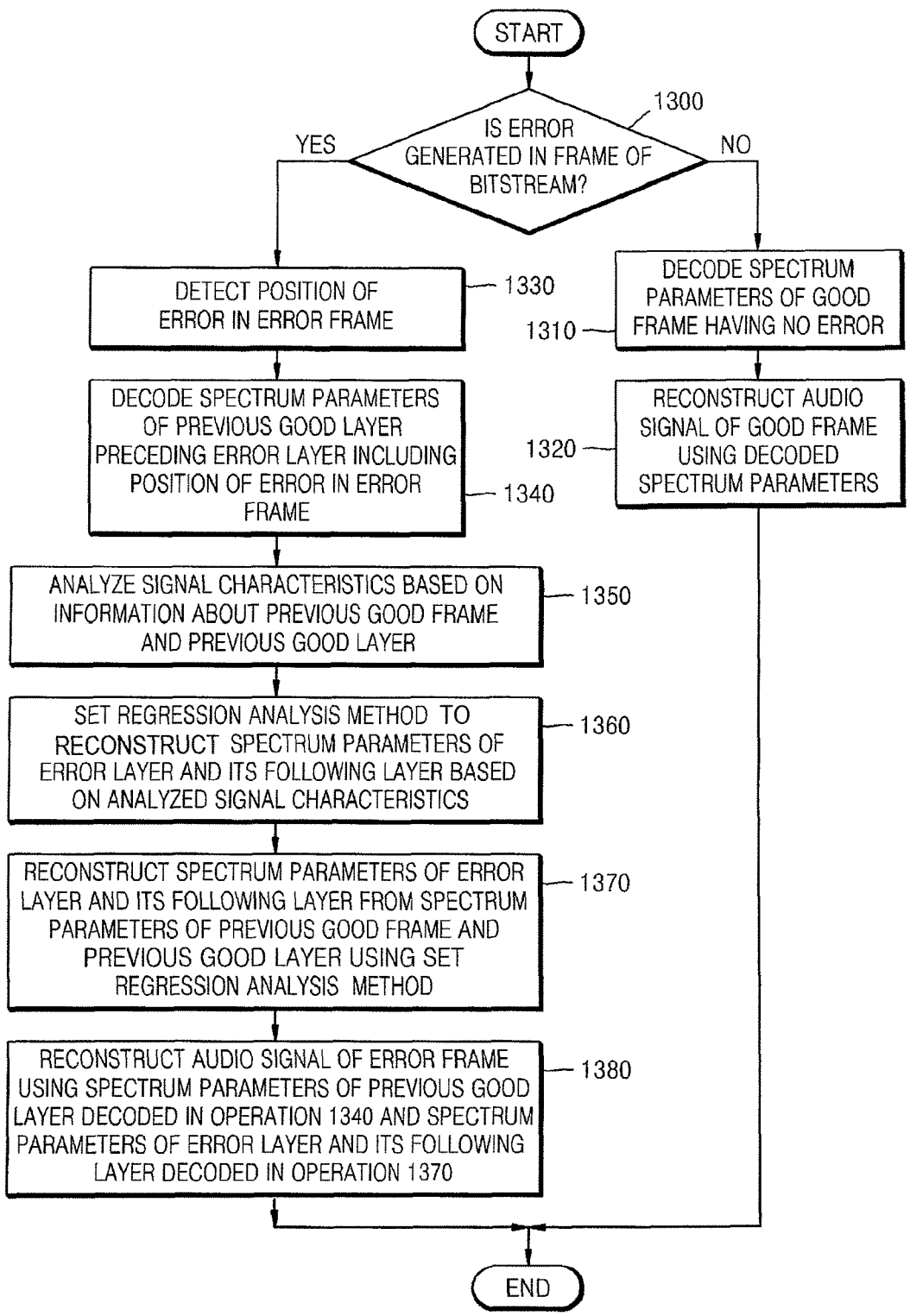

FRAME ERROR CONCEALMENT METHOD AND APPARATUS AND DECODING METHOD AND APPARATUS USING THE SAME

CROSS-REFERENCE TO RELATED APPLICATIONS

This application is a Continuation Application of U.S. patent application Ser. No. 14/272,643, filed on May 8, 2014, which is a Continuation Application of U.S. patent application Ser. No. 11/935,600, filed on Nov. 6, 2007 in the United States Patent and Trademark Office, which claims priority under 35 U.S.C. § 119(a) from Korean Patent Application No. 10-2006-0118563, filed on Nov. 28, 2006, in the Korean Intellectual Property Office, the disclosures of which are incorporated herein in their entirety by reference.

BACKGROUND OF THE INVENTION

1. Field of the Invention

The present general inventive concept relates to a method and apparatus to decode a voice signal or an audio signal, and more particularly, to a frame error concealment method and apparatus to conceal a frame error generated in a decoded signal.

2. Description of the Related Art

When packets are lost or distorted during transmission of an encoded audio signal over a wired/wireless network, an error may be generated in a frame of a decoded audio signal due to a transmission error. Unless the generated error is properly handled, the sound quality of the audio signal degrades in the frame having the error. Moreover, since a decoder reconstructs a signal using prediction, the generated error continuously propagates to the next frame and the sound quality of the audio signal also degrades in the next frame. Accordingly, it is important to efficiently conceal a frame error in order to prevent the sound quality of a reconstructed audio signal from degrading.

There are various frame error concealment methods such as a muting method, a repetition method, an interpolation method, an extrapolation method, and a regression analysis method. The muting method reduces volume in a frame having an error, which will be referred to hereinafter as an error frame (EF), thereby alleviating the influence of the error upon an output signal. The repetition method reconstructs a signal of the EF by repetitively reproducing a previous good frame (PGF) of the EF. The interpolation method predicts a parameter of the EF by interpolating a parameter of the PGF and a parameter of a next good frame (NGF). The extrapolation method obtains the parameter of the EF by extrapolating the parameter of the PGF. The regression analysis method obtains the parameter of the EF by regressively analyzing the parameter of the PGF.

Conventionally, however, since the EF has been reconstructed for any type of input signal using the same method, the frame error cannot be efficiently concealed, causing degradation in sound quality.

SUMMARY OF THE INVENTION

The present general inventive concept provides a frame error concealment method and apparatus, in which a frame error is concealed using a method that is optimized for characteristics of a signal, thereby accurately reconstructing an error frame (EF).

The present general inventive concept also provides a decoding method and apparatus, in which an EF is accurately reconstructed using a method that is optimized for the characteristics of a signal, thereby minimizing sound quality degradation caused by a frame error.

The present general inventive concept also provides a computer-readable medium having recorded thereon a program to implement the frame error concealment method and the decoding method.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a frame error concealment method including setting a concealment method to conceal an error based on one or more signal characteristics of an error frame having the error and concealing the error using the set concealment method. The setting operation may include setting a regression analysis method to conceal the error based on the one or more signal characteristics.

The setting operation may further include analyzing the one or more signal characteristics and setting the regression analysis method based on the analyzed one or more signal characteristics. The analyzing operation may include analyzing the one or more signal characteristics based on information about a previous good frame.

The setting the regression analysis method operation may include selecting at least one of a linear regression analysis and a non-linear regression analysis as the concealment method based on the one or more signal characteristics, setting a number of previous good frames to be referred to and to conceal the error using the set regression analysis method based on the one or more signal characteristics, or setting an interval to extract one or more parameters of a previous good frame to be referred to and to conceal the error using the set regression analysis method based on the one or more signal characteristics.

The concealing operation may include predicting a parameter of the error frame from one or more parameters of the previous good frame using the set regression analysis method. The concealing operation may further include deriving a regression analysis function to predict from the one or more parameters of the previous good frame using the set regression analysis method and predicting the parameter of the error frame using the derived regression analysis function. The concealing operation may further include adjusting the predicted parameter to a value included in a predetermined range when the predicted parameter falls outside the predetermined range.

The setting operation may include setting an adjustment function to adjust the predicted parameter based on the one or more signal characteristics and the predicting the parameter operation may include adjusting a coefficient of the derived function using the set adjustment function and predicting the parameter of the error frame using the coefficient-adjusted function. The function whose coefficient is adjusted using the set adjustment function may be a function to predict a parameter associated with energy information of the error frame.

The frame error concealment method may further include detecting the error frame from a bitstream.

The foregoing and/or other aspects and utilities of the present general inventive concept may also be achieved by providing a frame error concealment method including setting a concealment method to conceal an error for an error layer including a position of the error and its following layer in an error frame having the error based on one or more signal characteristics of the error frame and concealing the error using the set concealment method. The setting operation may include analyzing the one or more signal characteristics based on information about a previous good frame and information about a previous layer preceding the error layer and setting the concealment method to conceal the error based on the analyzed one or more signal characteristics.

The concealing operation may include predicting one or more parameters of the error layer and its following layer from one or more parameters of the previous good frame and the previous layer using the set concealment method.

The foregoing and/or other aspects and utilities of the present general inventive concept may also be achieved by providing a frame error concealment apparatus including a concealment method setting unit to set a concealment method to conceal an error based on one or more signal characteristics of an error frame having the error and an error concealment unit to conceal the error using the set concealment method. The concealment method setting unit may set a regression analysis method to conceal the error based on the one or more signal characteristics and the error concealment unit may conceal the error using the set concealment method.

The concealment method setting unit may include a signal characteristic analysis unit to analyze the one or more signal characteristics and a setting unit to set the regression analysis method based on the analyzed one or more signal characteristics. The signal characteristic analysis unit may analyze the one or more signal characteristics based on information about a previous good frame.

The concealment method setting unit may select at least one of a linear regression analysis and a non-linear regression analysis as the concealment method based on the one or more signal characteristics. The concealment method setting unit may set a number of previous good frames to be referred to and to conceal the error using the set regression analysis method based on the one or more signal characteristics. The concealment method setting unit may set an interval to extract one or more parameters of a previous good frame to be referred to conceal the error using the set regression analysis method based on the one or more signal characteristics.

The error concealment unit may predict a parameter of the error frame from one or more parameters of the previous good frame using the set regression analysis method.

The error concealment unit may include a function derivation unit to derive a regression analysis function to predict from the one or more parameters of the previous good frame using the set regression analysis method and a prediction unit to predict the parameter of the error frame using the derived regression analysis function. The error concealment unit may adjust the predicted parameter to a value included in a predetermined range when the predicted parameter falls outside the predetermined range.

The concealment method setting unit may set an adjustment function to adjust the predicted parameter based on the one or more signal characteristics, and the error concealment unit may further include an adjustment unit that adjusts a coefficient of the derived function using the set adjustment function and the prediction unit predicts the parameter of the error frame using the coefficient-adjusted function. The function whose coefficient is adjusted using the set adjustment function may be a function to predict a parameter associated with energy information of the error frame.

The frame error concealment apparatus may further include an error detection unit to detect the error frame from a bitstream.

The foregoing and/or other aspects and utilities of the present general inventive concept may also be achieved by providing a frame error concealment apparatus including a concealment method setting unit to set a concealment method to conceal an error for an error layer including a position of the error and its following layer in an error frame having the error based on one or more signal characteristics of the error frame and an error concealment unit concealing the error using the set concealment method. The concealment method setting unit may further include a signal characteristic analysis unit to analyze the one or more signal characteristics based on information about a previous good frame and information about a previous layer preceding the error layer and a setting unit to set the concealment method to conceal the error based on the analyzed one or more signal characteristics.

The error concealment unit may predict one or more parameters of the error layer and its following layer from one or more parameters of the previous good frame and the previous layer using the set concealment method.

The foregoing and/or other aspects and utilities of the present general inventive concept may also be achieved by providing a decoding method including detecting an error frame having an error from a bitstream, decoding a frame having no error in the bitstream, setting a concealment method to conceal the error based on one or more signal characteristics of the error frame, and concealing the error using the set concealment method.

The foregoing and/or other aspects and utilities of the present general inventive concept may also be achieved by providing a decoding method including detecting an error frame having an error from a bitstream and a position of the error in the error frame, decoding a frame having no error in the bitstream and a previous layer preceding an error layer including the position of the error in the error frame, setting a concealment method to conceal the error based on one or more signal characteristics of the error frame, and concealing the error using the set concealment method.

The foregoing and/or other aspects and utilities of the present general inventive concept may also be achieved by providing a decoding apparatus including an error detection unit to detect an error frame having an error from a bitstream, a decoding unit to decode a frame having no error in the bitstream, and an error concealment unit to set a concealment method to conceal the error based on one or more signal characteristics of the error frame and to conceal the error using the set concealment method.

The foregoing and/or other aspects and utilities of the present general inventive concept may also be achieved by providing a decoding apparatus including an error detection unit to detect an error frame having an error from a bitstream and a position of the error in the error frame, a decoding unit to decode a frame having no error in the bitstream and a previous layer preceding an error layer including the position of the error in the error frame, and an error concealment unit to set a concealment method to conceal the error based on one or more signal characteristics of the error frame and concealing the error using the set concealment method.

The foregoing and/or other aspects and utilities of the present general inventive concept may also be achieved by providing a computer-readable medium having recorded thereon a program to implement the frame error concealment method setting a concealment method to conceal an error based on one or more signal characteristics of an error frame having the error, and concealing the error using the set concealment method.

The foregoing and/or other aspects and utilities of the present general inventive concept may also be achieved by providing a method of concealing an error of an audio signal transmitted in a plurality of frames, the method including detecting an error frame having an error in one or more of the plurality of frames transmitting the audio signal, setting a concealment process to conceal the error based on one or more signal characteristics of the error frame, and concealing the error using the set concealment process.

The foregoing and/or other aspects and utilities of the present general inventive concept may also be achieved by providing a method of reconstructing an audio signal, the method including determining whether an error frame having an error exists and, if so, analyzing one or more signal characteristics of the error frame based on information about a previous frame not having an error, setting a regression analysis process based on the analyzed one or more signal characteristics, reconstructing a spectrum parameter of the error frame from one or more spectrum parameters of the previous frame using the regression analysis process, and reconstructing the audio signal using an audio signal of the error frame and the reconstructed spectrum parameter.

The foregoing and/or other aspects and utilities of the present general inventive concept may also be achieved by providing a method of reconstructing an audio signal, the method including determining whether an error frame having an error exists and, if so, analyzing one or more signal characteristics of the error frame based on information about a previous frame not having an error, setting a regression analysis process based on the analyzed one or more signal characteristics, reconstructing a gain parameter of the error frame from one or more gain parameters of the previous frame not having the error using the regression analysis process, reconstructing an excitation signal of the error frame based on the reconstructed gain parameter, reconstructing a line spectral pair (LSP) parameter of the error frame from an LSP parameter of the previous frame using the regression analysis process, and reconstructing the audio signal using an audio signal of the error frame, the reconstructed LSP parameter and the reconstructed excitation signal.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 2 is a block diagram of a voice decoding apparatus illustrating a frame error concealment apparatus according to an embodiment of the present general inventive concept;

FIG. 3A is a detailed block diagram illustrating an excitation signal reconstruction unit illustrated in FIG. 2;

FIG. 3B is a detailed block diagram illustrating a line spectral pair (LSP) reconstruction unit illustrated in FIG. 2;

FIG. 13 is a flowchart illustrating an audio decoding method using a frame error concealment method according to another embodiment of the present general inventive concept.

DETAILED DESCRIPTION OF THE PREFERRED EMBODIMENTS

Figure 1A:
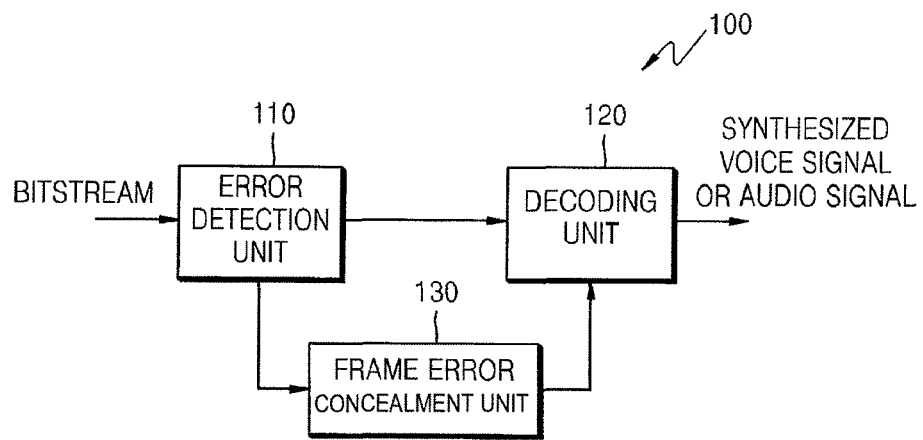
FIG. 1A is a block diagram of an audio decoding apparatus illustrating a frame error concealment apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1B:
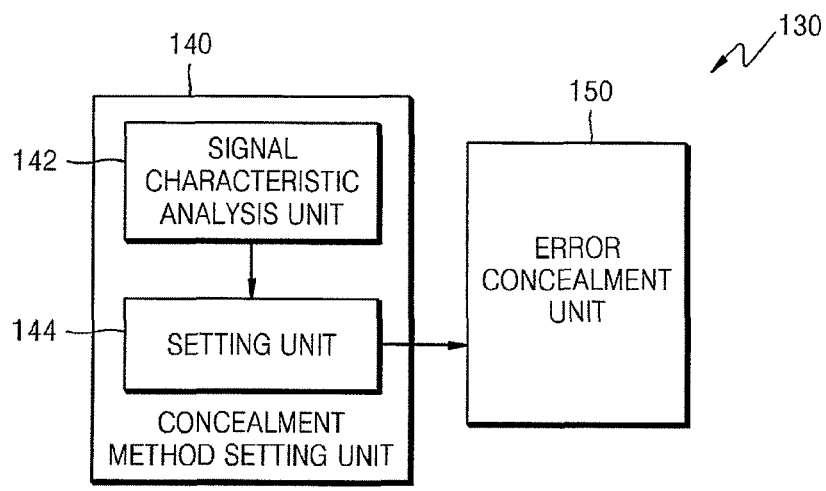
FIG. 1B is a detailed block diagram of a frame error concealment unit illustrated in FIG. 1A.

FIG. 1A is a block diagram illustrating an audio decoding apparatus 100 including a frame error concealment apparatus according to an embodiment of the present general inventive concept, and FIG. 1B is a detailed block diagram illustrating a frame error concealment unit 130 illustrated in FIG. 1A. Referring to FIGS. 1A and 1B, the audio decoding apparatus 100 includes an error detection unit 110, a decoding unit 120, and the frame error concealment unit 130. The frame error concealment unit 130 includes a concealment method setting unit 140 and an error concealment unit 150. The concealment method setting unit 140 includes a signal characteristic analysis unit 142 and a setting unit 144.

The error detection unit 110 detects a frame having an error, which will be referred to hereinafter as an error frame (EF), from a transmitted bitstream, and informs the frame error concealment unit 130 that the EF is detected. The frame may be a single frame or a sub frame included in a single frame.

The decoding unit 120 decodes a good frame (GF) having no error in the bitstream. The decoding unit 120 may be implemented by using a voice codec such as International Telecommunication Union—Telecommunication Standardization Sector (ITU-T) G.729 or an audio codec such as Moving Picture Experts Group (MPEG)-2/4 Advanced Audio Coding (AAC), and Moving Picture Experts Group-Bit Sliced Arithmetic Coding (MPEG-BSAC).

The signal characteristic analysis unit 142 analyzes the signal characteristics of the EF detected by the error detection unit 110 and transmits the analyzed signal characteristics to the setting unit 144. The setting unit 144 sets a concealment method to conceal a frame error based on the transmitted signal characteristics. The error concealment unit 150 conceals the frame error using the set concealment method.

Hereinafter, the operation of a frame error concealment apparatus according to an embodiment of the present general inventive concept and the operation of a decoding apparatus using the frame error concealment apparatus will be described in detail where a signal to be reconstructed is a voice signal and where a signal to be reconstructed is an audio signal.

FIG. 2 is a block diagram illustrating a voice decoding apparatus 200, including a frame error concealment apparatus (unit) 230 according to an embodiment of the present general inventive concept. The voice decoding apparatus 200 includes an error detection unit 210, a decoding unit 220, and the frame error concealment unit 230. The decoding unit 220 includes an excitation signal decoding unit 240, a line spectral pair (LSP) decoding unit 250, an LSP/linear prediction coefficient (LPC) conversion unit 260, and a synthesis filter 270. The frame error concealment unit 230 includes a concealment method setting unit 280 and an error concealment unit 290. The concealment method setting unit 280 includes a signal characteristic analysis unit 282 and a setting unit 284. The error concealment unit 290 includes an excitation signal reconstruction unit 292 and an LSP reconstruction unit 294.

Hereinafter, the operation of the voice decoding apparatus 200 illustrated in FIG. 2 will be described.

The error detection unit 210 detects an EF from a bitstream and transmits the EF to the frame error concealment unit 230, and transmits a GF to the decoding unit 220.

The decoding unit 220 decodes parameters of the transmitted GF and reconstructs a voice signal using the decoded parameters. When a code excited linear prediction algorithm based on a voice utterance model is used in an embodiment of the present general inventive concept, the decoding unit 220 reconstructs an LSP parameter having 10 roots obtained by analyzing the frequency characteristics of the voice signal and parameters to synthesize an excitation signal and synthesizes the voice signal using the reconstructed parameters. The parameters to synthesize the excitation signal may include a pitch period, a pulse sound source (the position of a pulse), a gain gc for a pulse sound source signal, and a gain gp for an adaptive codebook sound source signal. The excitation signal decoding unit 240 decodes the parameters to synthesize the excitation signal and synthesizes excitation signal using the decoded parameters.

The frame error concealment unit 230 sets a concealment method to conceal an EF according to signal characteristics and conceals a frame error using the set concealment method.

In an embodiment of the present general inventive concept, the concealment method setting unit 280 analyzes the signal characteristics and sets a regression analysis method considering the analyzed signal characteristics, and the error concealment unit 290 conceals a frame error using the set regression analysis method. For purposes of clarity, frame error concealment performed by the error concealment unit 290 using the regression analysis method will be described prior to a description regarding setting of the regression analysis method to conceal frame error.

As discussed previously, the parameters to synthesize the excitation signal may include a pitch period, a fixed codebook index, an adaptive codebook gain gp, and a fixed codebook gain gc. The excitation signal reconstruction unit 292 predicts a parameter to synthesize an excitation signal of an EF from a parameter to synthesize an excitation signal of a previous good frame (PGF) and synthesizes the excitation signal of the EF using the predicted parameter, thereby reconstructing the excitation signal. The parameter to synthesize the excitation signal of the PGF is reconstructed by the excitation signal decoding unit 240 illustrated in FIG. 2 and may be stored in a predetermined buffer (not illustrated) for use in reconstruction of the EF. When an EF is detected, the excitation signal reconstruction unit 292 may read the parameter corresponding to the PGF from the predetermined buffer and reconstruct the excitation signal of the EF.

Hereinafter, the operation of the excitation signal reconstruction unit 292 will be described with reference to FIG. 3A. FIG. 3A is a detailed block diagram illustrating the excitation signal reconstruction unit 292 illustrated in FIG. 2. The excitation signal reconstruction unit 292 includes a first function derivation unit 300, a gain adjustment unit 310, a first prediction unit 320, a first post-processing unit 330, and an excitation signal synthesis unit 340.

The first function derivation unit 300 derives a function from gain parameters gp and gc of the PGF by using regression analysis. The derived function is a linear function or a non-linear function. The non-linear function may be an exponential function, a logarithmic function, or a power function. When the concealment method setting unit 280 (FIG. 2) sets linear regression analysis to predict a parameter of an EF, a linear function may be derived. When the concealment method setting unit 280 sets non-linear regression analysis to predict the parameter of the EF, the non-linear function may be derived. A single frame is composed of a plurality of sub frames and a function for a gain is derived from a gain parameter of each of the sub frames by using regression analysis.

Figure 4A:
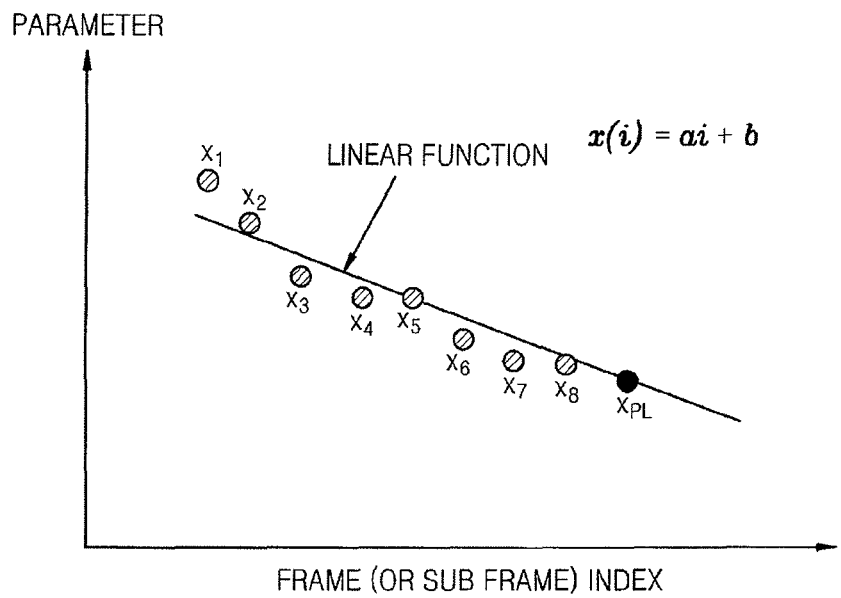
FIG. 4A is a graph illustrating an exemplary function derived using linear regression analysis.
Figure 4B:
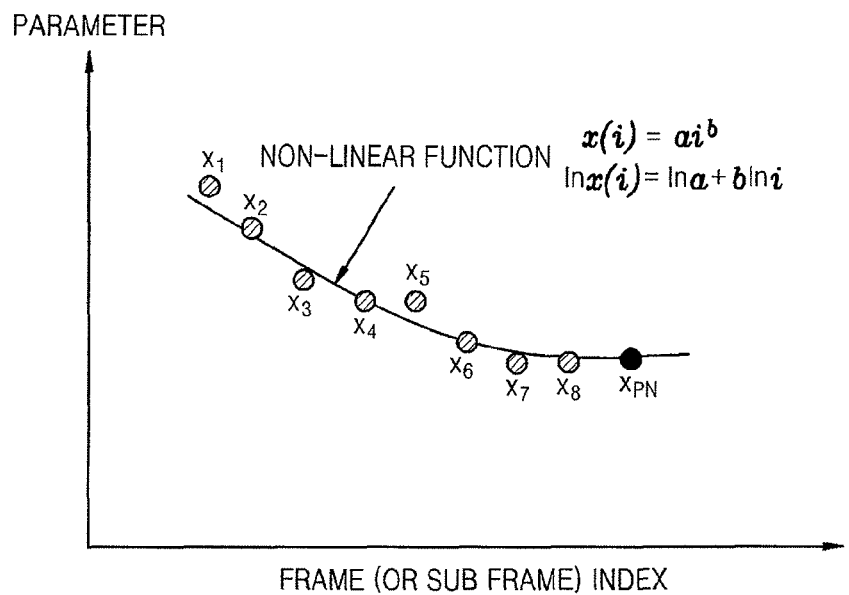
FIG. 4B is a graph illustrating an exemplary function derived using non-linear regression analysis.

FIGS. 4A and 4B are graphs illustrating exemplary functions derived using linear regression analysis and non-linear regression analysis with respect to parameters of a PGF or a sub frame. In FIG. 4A, a linear function is derived from gain parameters (x1, x2, through to x8) of the PGF. In FIG. 4B, a non-linear function is derived from the gain parameters (x1, x2, through to x8) of the PGF. In FIGS. 4A and 4B, a and b are constants obtained by regression analysis.

Referring to FIG. 3A, the gain adjustment unit 310 adjusts a coefficient of the derived function according to a voiced level of the PGF. For example, when the first function derivation unit 300 derives a linear function such as Equation 1, the gain adjustment unit 310 adjusts a coefficient of the derived non-linear function as in Equation 2.

$$x(i)=ax+b \quad (1)$$

$$a'=f(g_p(n),g_p(n-1),\ldots,g_p(n-K))a \quad (2),$$

where a and b are constants obtained by regression analysis, and where f ( ) is a gain adjustment function that reduces a gradient a' when a voiced level is high. $g_p(n)$, $g_p(n-1), \ldots, g_p(n-K)$ are adaptive codebook gain parameters of a PGF. Since the same signal is repeated for a predetermined amount of time in voiced sound, significant reduction in an amplitude of a voice signal can be adaptively prevented by reducing the gradient a' when a voiced level is high. The gain adjustment unit 310 compensates for inaccurate prediction of a gain of the EF by regression analysis. High correlation between a current signal and its previous signal in voiced sound originates from energy distribution of a voice signal and a gain parameter has correlation with the energy of the voice signal. Accordingly, gain adjustment is applied to the gain parameter.

Referring to FIGS. 2 and 3A, the first prediction unit 320 predicts a parameter of the EF using the function whose coefficient is adjusted by the gain adjustment unit 310. When the concealment method setting unit 280 sets linear regression analysis as a concealment method to predict the parameter of the EF, a gain parameter xPL of the EF is predicted using a linear function, for example, like in FIG. 4A. When the concealment method setting unit 280 sets non-linear regression analysis as a concealment method to predict the parameter of the EF, a gain parameter xPN of the EF is predicted using a non-linear function. When the first function derivation unit 300 derives a linear function such as Equation 1 and the gain adjustment unit 310 adjusts the coefficient of the derived function, for example, like in Equation 2, the first prediction unit 320 may predict a gain parameter, $\hat{x}(i)$, using the coefficient-adjusted function, as follows:

$$\hat{x}(i) = a'i + b \quad (3)$$

where a' is an adjusted coefficient and b is a constant obtained by regression analysis.

The first post-processing unit 330 optimizes the predicted gain parameter. For example, an upper limit and a lower limit are preset, and when the predicted gain parameter is greater than the upper limit or less than the lower limit, it is adjusted to fall within a predetermined range defined by the upper limit and the lower limit, thereby preventing the gain parameter from being predicted as being an improbable value.

The excitation signal synthesis unit 340 synthesizes the excitation signal of the EF by referring to the gain parameters gp and gc of the EF, which are predicted by the gain adjustment unit 314 or the first prediction unit 320. In an embodiment of the present general inventive concept, a pitch period of a fixed codebook index of a previous frame or an arbitrarily generated value may be used as a pitch period or a fixed codebook index required to synthesize the excitation signal of the EF. More details can be found in a unique function to conceal a frame error in ITU-T G. 729 that is incorporated herein in its entirety by reference.

The excitation signal synthesized by the excitation signal synthesis unit 340 is a reconstructed excitation signal for the EF and is output to the synthesis filter 270 illustrated in FIG. 2.

Hereinafter, the operation of the LSP reconstruction unit 294 will be described with reference to FIG. 3B. FIG. 3B is a detailed block diagram illustrating the LSP reconstruction unit 294 illustrated in FIG. 2. The LSP reconstruction unit 294 includes an LSP/spectrum conversion unit 350, a second function derivation unit 360, a second prediction unit 370, a second post-processing unit 380, and a spectrum/LSP conversion unit 390. The LSP reconstruction unit 294 reconstructs an LSP parameter of the EF from an LSP parameter of the PGF using regression analysis.

Referring to FIGS. 2 and 3B, the LSP parameter of the PGF is reconstructed by the LSP decoding unit 250 and may be stored in a predetermined buffer (not illustrated) for use in reconstruction of the EF, like in the excitation signal reconstruction unit 292. When the EF is detected, the LSP reconstruction unit 294 may read a parameter of the PGF stored in the predetermined buffer and reconstruct the LSP parameter of the EF.

The LSP/spectrum conversion unit 350 converts the LSP parameter of the PGF, which has 10 roots, into a spectral domain to obtain a spectrum parameter.

The second function derivation unit 360 derives a function from the spectrum parameter of the PGF using regression analysis. Like in the first function derivation unit 300, the derived function may be a linear function or a non-linear function according to the setting of the concealment method setting unit 280. FIGS. 4A and 4B are graphs illustrating exemplary functions derived using regression analysis and non-linear regression analysis with respect to parameters of a PGF or a sub frame. In FIG. 4A, a linear function $x(i) = ax + b$ is derived from spectrum parameters (x1, x2, through to x8) of the PGF. In FIG. 4B, a non-linear function $x(i) = a$ is derived from spectrum gain parameters (x1, x2, through to x8) of the PGF. In FIGS. 4A and 4B, a and b are constants obtained by regression analysis.

The second prediction unit 370 predicts a spectrum parameter of the EF using the derived function. A spectrum parameter xPL of the EF is predicted using a linear function in FIG. 4A and a spectrum parameter xPN of the EF is predicted using a non-linear function in FIG. 4B.

The second post-processing unit 380 optimizes the predicted LSP parameter. For example, an upper limit and a lower limit are preset, and when the predicted gain parameter is greater than the upper limit or less than the lower limit, it is adjusted to fall within a predetermined range defined by the upper limit and the lower limit, thereby preventing the gain parameter from being predicted as being an improbable value.

The spectrum/LSP conversion unit 390 converts the predicted spectrum parameter to the LSP parameter in order to reconstruct the LSP parameter of the ER The reconstructed LSP parameter is output to the LSP/LPC conversion unit 260 illustrated in FIG. 2.

As discussed above, the LSP parameter of the EF, which is reconstructed by the LSP reconstruction unit 294, is output to the LSP/LPC conversion unit 260 and the excitation signal of the EF, which is reconstructed by the excitation signal reconstruction unit 292, is output to the synthesis filter 270. Thus, the decoding unit 220 decodes a signal of the EF using the LPS parameter and the excitation signal that are reconstructed by the frame error concealment unit 230 in the same manner as when it decodes a signal of a GR By doing so, the error of the EF can be concealed.

Hereinafter, a process of setting a regression analysis method based on signal characteristics in the concealment method setting unit 280 will be described. Referring to FIG. 2, the concealment method setting unit 280 includes the signal characteristic analysis unit 282 and the setting unit 284.

The signal characteristic analysis unit 282 analyzes the signal characteristics of the EF based on information about the PGF. The analyzed signal characteristics are used for the setting unit 234 to set a concealment method to conceal a frame error. According to an embodiment of the present general inventive concept, the signal characteristic analysis unit 282 analyzes signal characteristics based on class information of the PGF. The class information is obtained by classifying a voice signal according to the characteristics of a frequency shift and may be one of Voiced, Unvoiced, Transition, Onset, Offset, Silence, and Background Noise.

When the signal characteristic analysis unit 282 analyzes signal characteristics based on the class information of the PGF, it may perform analysis according to the class information as follows. Since a constant frequency continues for a predetermined long period of time in voiced sound, when the class information of the PGF is Voiced, correlation between the current signal and its previous signal is high. In contrast, correlation between the current signal and its previous signal is low in unvoiced sound or background noise. Accordingly, signal characteristics such as whether parameters representing the characteristics of voice changes linearly or non-linearly or having high correlation with those of a previous frame can be analyzed according to whether the voice signal is in a voiced, unvoiced, or transition state.

According to another embodiment of the present general inventive concept, the signal characteristic analysis unit 282 may analyze signal characteristics based on energy information of the PGF. Accordingly, the signal characteristic analysis unit 282 may analyze signal correlation between the current frame and its previous frame by analyzing whether a signal is stable or unstable according to a change of energy. The signal characteristics can also be analyzed according to various aspects of the present general inventive concept in addition to the above-described embodiments of the present general inventive concept.

The setting unit 284 sets a regression analysis method to conceal a frame error based on the signal characteristics analyzed by the signal characteristic analysis unit 282. For example, the setting unit 284 may set whether to use linear regression analysis or non-linear regression analysis or set the number of PGFs to be referred to for regression analysis. When the gain parameter of the EF is predicted using regression analysis, the setting unit 284 may also set an adjustment function to adjust predicted parameters.

Figure 7:
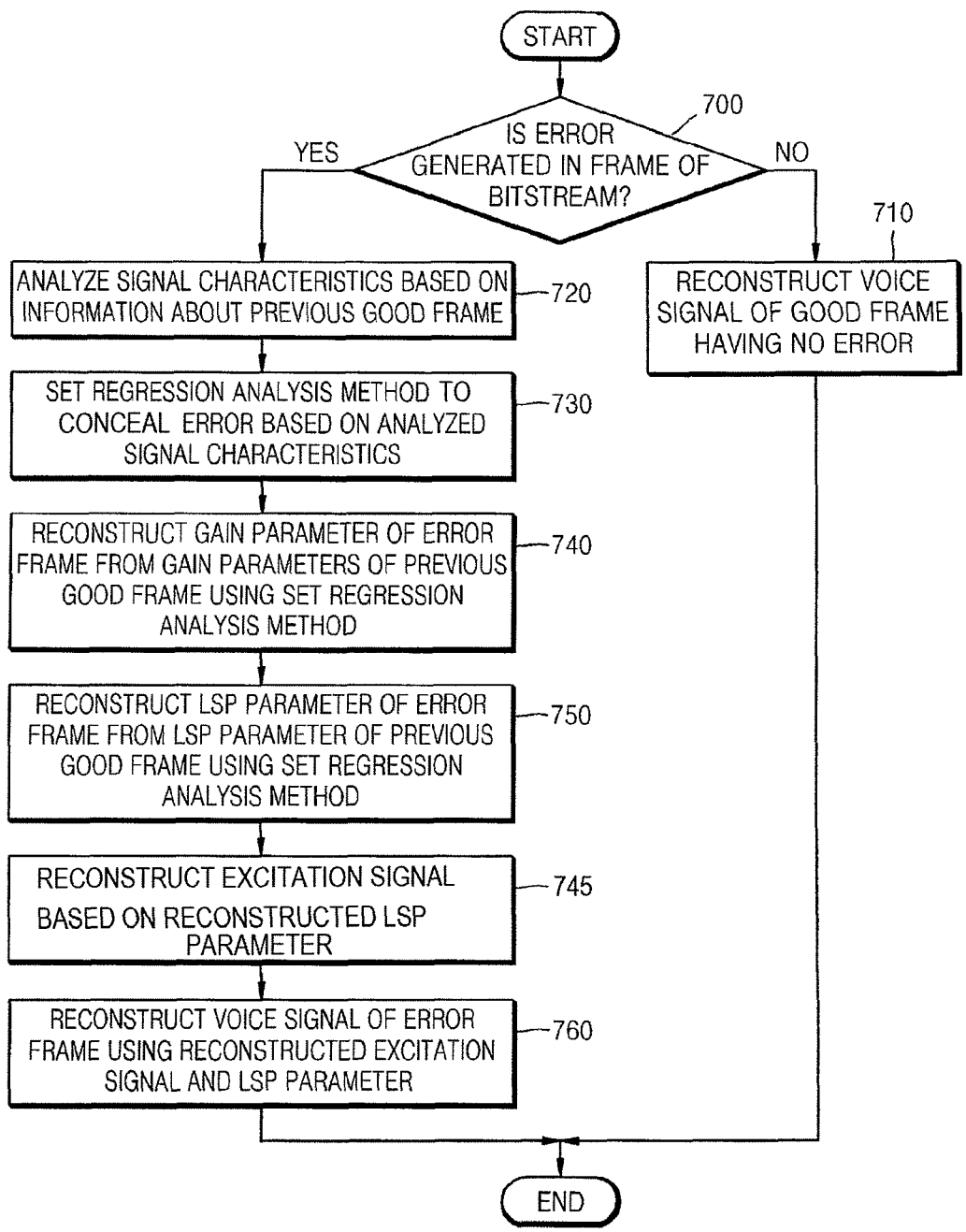
FIG. 7 is a flowchart of a voice decoding method illustrating a frame error concealment method according to an embodiment of the present general inventive concept.
Figure 8:
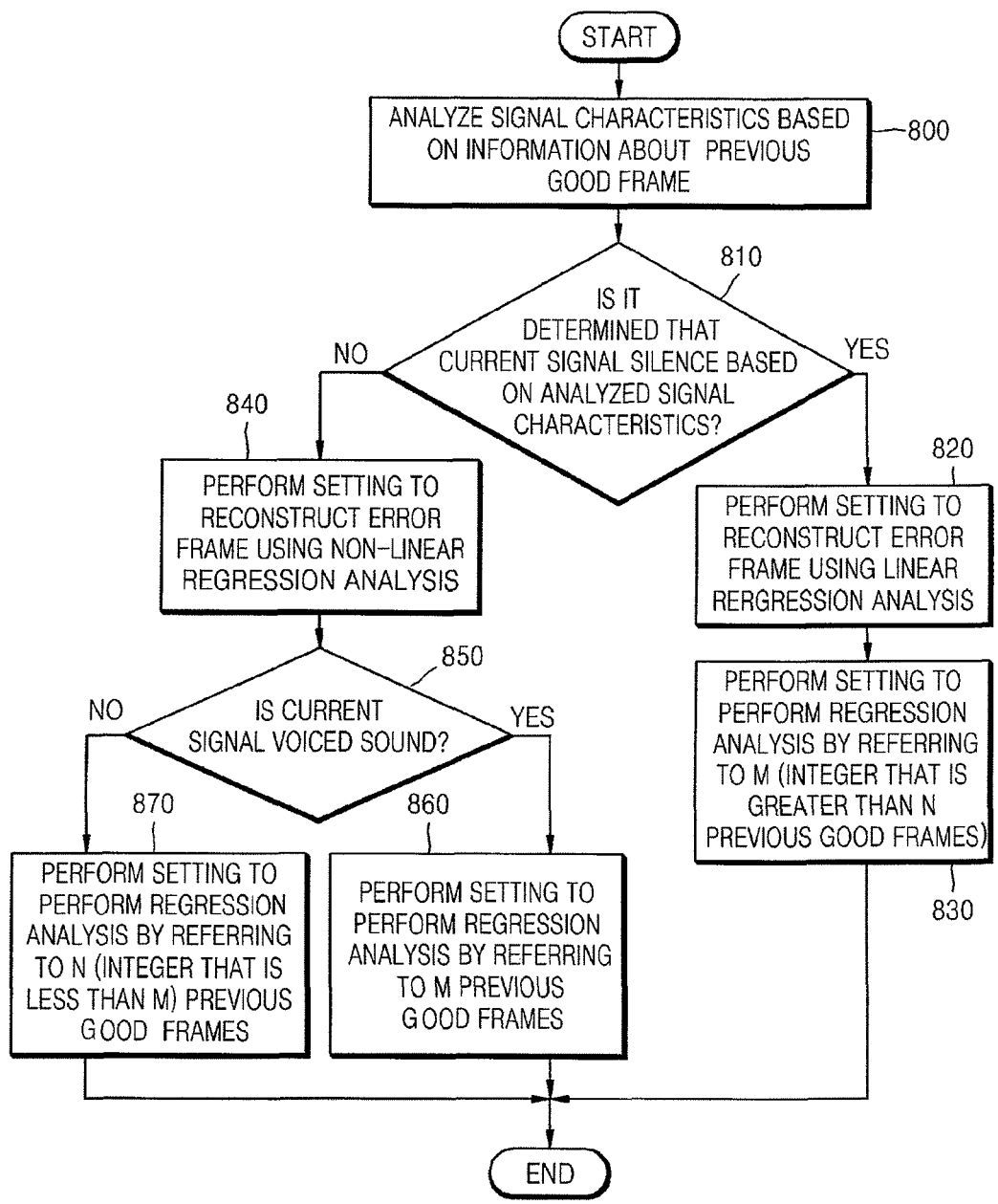
FIG. 8 is a detailed flowchart illustrating signal characteristic analysis and concealment method setting illustrated in FIG. 7.

Hereinafter, setting of the concealment method setting unit 280 according to an embodiment of the present general inventive concept will be described with reference to FIGS. 2 and 8. FIG. 8 is a detailed flowchart illustrating signal characteristic analysis and concealment method setting illustrated in FIG. 7.

In operation 800, the signal characteristic analysis unit 282 analyzes signal characteristics based on the class information or energy information of the PGF. The signal characteristic analysis unit 282 analyzes whether the current signal is voiced sound, unvoiced sound, silence, in a transition state, in an onset state, in an offset state, or background noise.

In operation 810, the setting unit 284 determines whether the current signal is silence based on the analyzed signal characteristics. If it is determined that the current signal is silence, the setting unit 284 performs setting to use linear regression analysis to reconstruct a parameter of the EF in operation 820 and to perform regression analysis by referring to M PGFs in operation 830. If it is determined that the current signal is not silence in operation 810, the setting unit 284 performs setting to use non-linear regression analysis to reconstruct a parameter of the EF in operation 840. The setting unit 284 determines whether the current signal is voiced sound in operation 850. If it is determined that the current signal is voiced sound, the setting unit 284 performs setting to perform regression analysis by referring to parameters of M PGFs in operation 860. If it is determined that the current signal is not voiced sound in operation 850, the setting unit 284 performs setting to perform regression analysis by referring to N PGFs in operation 870. For example, M may be an integer that is greater than N. Since voiced sound has high correlation with a previous signal, it is desirable to refer to a longer interval of the previous signal than with unvoiced sound in order to obtain an accurate and natural signal. However, there may be various methods to analyze signal characteristics and setting frame error concealment methods based on the analyzed signal characteristics without being limited to the above description and methods that can be easily construed from the present general inventive concept by those of ordinary skill in the art that are within the scope of the present general inventive concept.

The error concealment unit 290 conceals a frame error according to a concealment method set by the concealment method setting unit 280. The operation of the error concealment unit 290 has already been described above.

Figure 5:
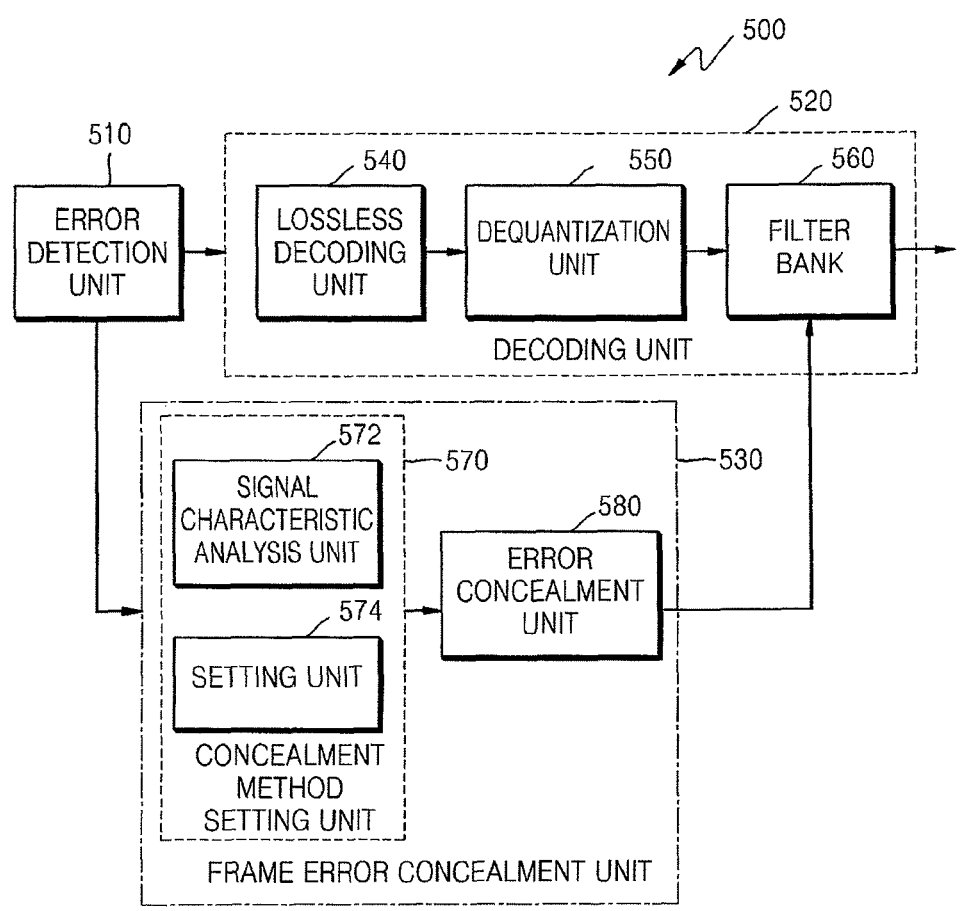
FIG. 5 is a block diagram of an audio decoding apparatus illustrating a frame error concealment apparatus according to another embodiment of the present general inventive concept.

An audio decoding apparatus 500 including a frame error concealment apparatus (unit) 530 according to another embodiment of the present general inventive concept will now be described with reference to FIG. 5. Referring to FIG. 5, the audio decoding apparatus 500 includes an error detection unit 510, a decoding unit 520, and the frame error concealment unit 530. The decoding unit 520 includes a lossless decoding unit 540, a dequantization unit 550, and a filter bank 560. The frame error concealment unit 530 includes a concealment method setting unit 570 and an error concealment unit 580. The concealment method setting unit 570 includes a signal characteristic analysis unit 572 and a setting unit 574.

In general, an audio encoding apparatus according to MPEG-2/4 AAC performs modulated discrete cosine transformation (MDCT) on an audio signal in order to extract a spectrum parameter for frequency components of the audio signal. The audio encoding apparatus performs lossless encoding on the extracted spectrum parameter in order to generate a bitstream and transmits the generated bitstream to the audio decoding apparatus 500.

Like in FIG. 2, the error detection unit 510 detects an EF from the transmitted bitstream and provides the detected EF to the frame error concealment unit 530, and provides a GF to the decoding unit 520.

The decoding unit 520 reconstructs a spectrum parameter of the provided GF and synthesizes an audio signal of the GF from the reconstructed spectrum parameter. The lossless decoding unit 540 performs lossless decoding on a bitstream corresponding to the GF using a Huffman algorithm and the dequantization unit 550 dequantizes the GF, thereby reconstructing the spectrum parameter. The filter bank 560 performs inverse MDCT on the reconstructed spectrum and reconstructs an audio signal of a time domain.

The signal characteristic analysis unit 572 analyzes signal characteristics based on information about a PGF of the EF. The information about the PGF for the analysis may include attack signal information, window information, and energy information.

The attack signal information may include information about attack sound included in a frame. The attack sound indicates sound having a strong bass band included in an audio signal and the attack sound is not periodic. Thus, when the attack sound is included in the audio signal, the signal characteristic analysis unit 560 may analyze that the correlation between the current signal and its previous signal is not high.

The window information may include information about the size or shape of a window that has been used when the audio encoding apparatus performs MDCT with respect to pulse code modulation (PCM) samples that are obtained by sampling and quantizing the audio signal. In order to extract the spectrum parameter, the audio encoding apparatus performs MDCT with respect to a time-domain signal using a large window for a static signal that changes little in terms of frequency spectrum, while performing MDCT using a small window for a dynamic signal that changes by a large amount in terms of frequency spectrum. Thus, when the size of a window used by the audio encoding apparatus is large, the signal characteristic analysis unit 572 may analyze that the current signal is static and thus the correlation between the current signal and its previous signal is high. However, when the size of the window is small, the signal characteristic analysis unit 572 may analyze that the correlation between the current signal and its previous signal is low or an interval of the previous signal, which has high correlation with the current signal, is short.

The energy information may include energy information of a frame or a sub frame. The signal characteristic analysis unit 572 recognizes a change of the energy of the previous signal from energy information of the PGF and analyzes whether the current signal is static or dynamic according to the change of the energy. When the energy of the previous signal changes little or is stable, the signal characteristic analysis unit 572 may analyze that the current signal is a static signal having high correlation with the previous signal. When the energy of the previous signal changes by a large amount or its change is not predictable, the signal characteristic analysis unit 572 may analyze that the current signal is a dynamic signal having low correlation with the previous signal. Signal characteristic analysis may be possible according to various aspects of the present general inventive concept without being limited to the above-described embodiments of the present general inventive concept.

According to another embodiment of the present general inventive concept, the signal characteristic analysis unit 572 may analyze whether the current signal is static or dynamic by considering at least one of attack signal information, window information, and energy information and provide the analyzed signal characteristics to the setting unit 574.

The setting unit 574 sets a regression analysis method to conceal a frame error based on the signal characteristics provided by the signal characteristic analysis unit 572. Like the setting unit 284 illustrated in FIG. 3, the setting unit 574 may set whether to use linear regression analysis or non-linear regression analysis or the number of PGFs to be referred to for regression analysis. When a spectrum parameter of the EF is predicted using regression analysis, an adjustment function to adjust the predicted spectrum parameter may also be set.

Figure 11:
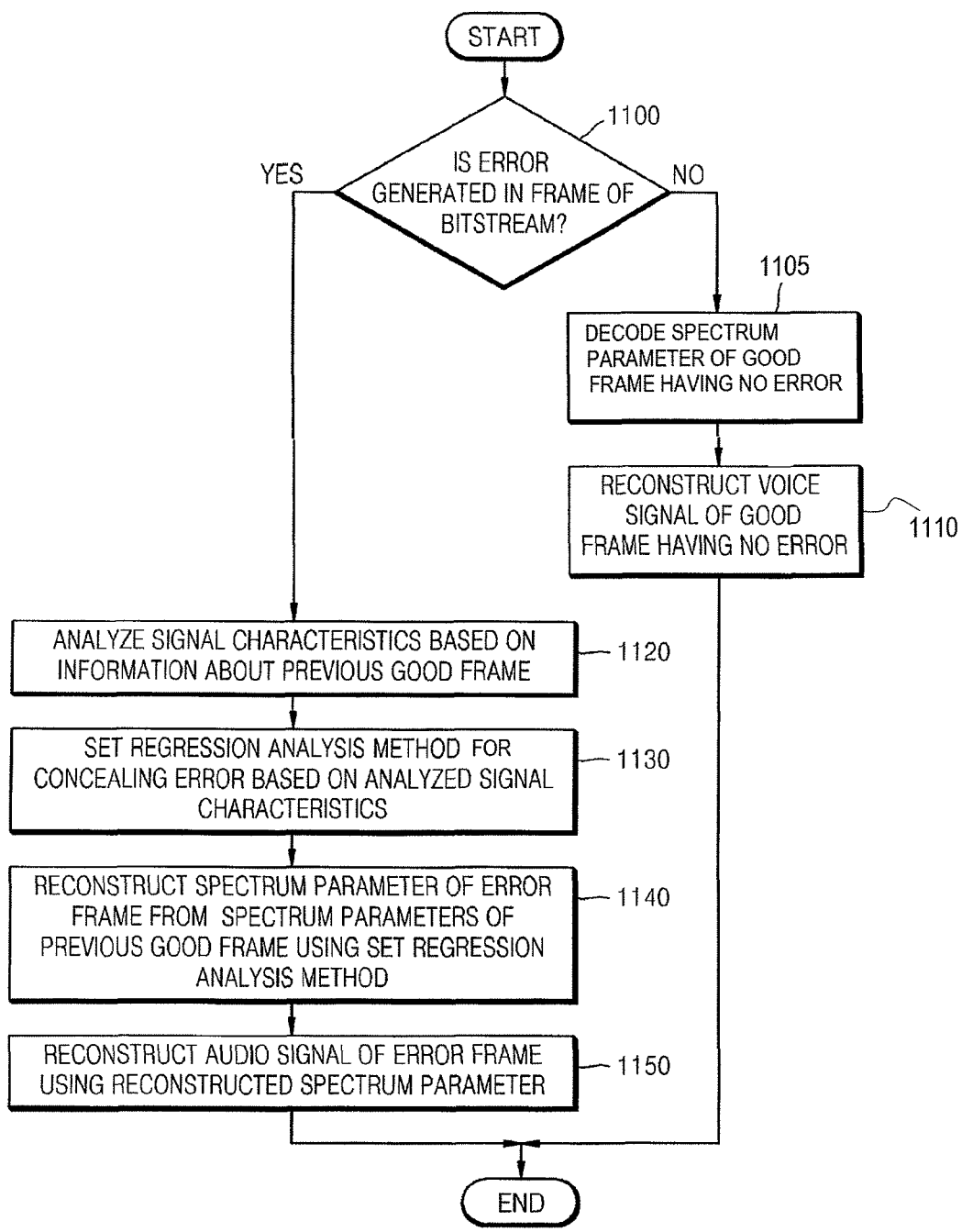
FIG. 11 is a flowchart illustrating an audio decoding method using a frame error concealment method according to an embodiment of the present general inventive concept.
Figure 12:
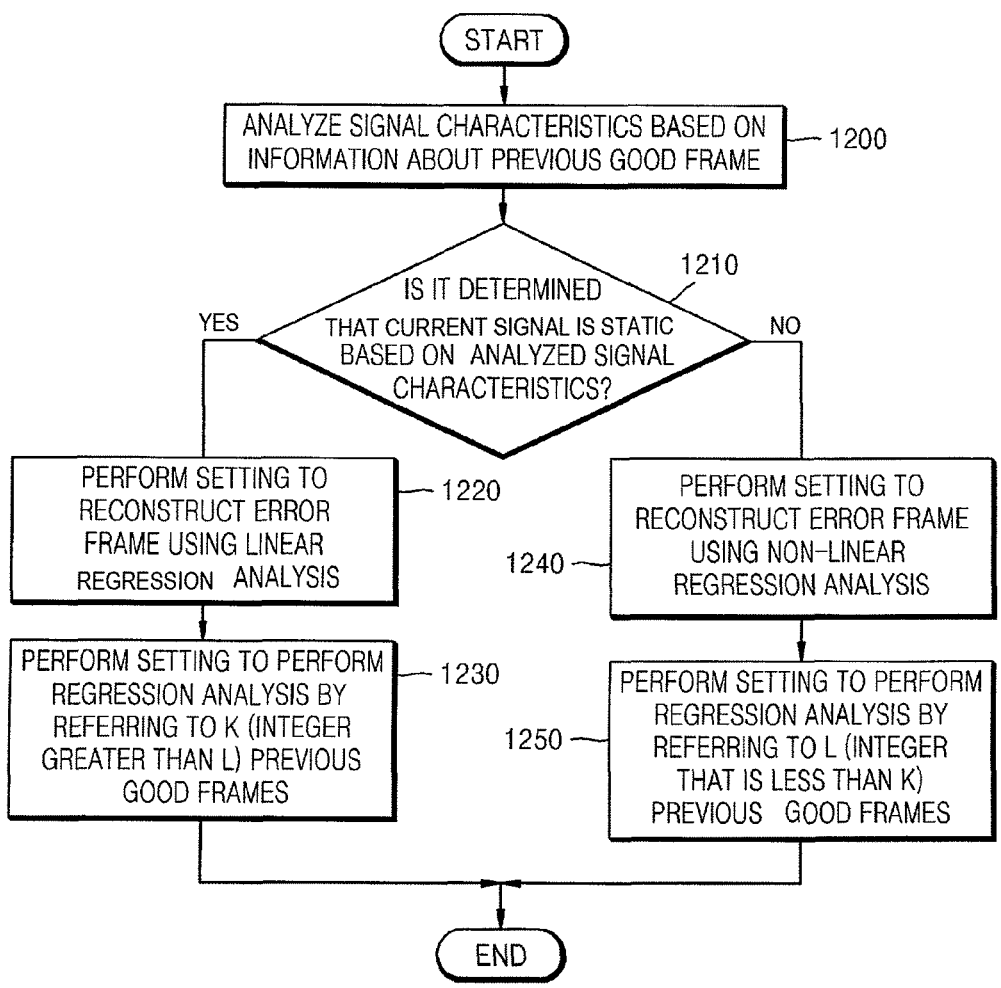
FIG. 12 is a detailed flowchart illustrating signal characteristic analysis and concealment method setting illustrated in FIG. 11.

Hereinafter, setting of the concealment method setting unit 570 according to another embodiment of the present general inventive concept will be described with reference to FIGS. 5 and 12. FIG. 12 is a detailed flowchart illustrating signal characteristic analysis and concealment method setting illustrated in FIG. 11.

In operation 1200, the signal characteristic analysis unit 572 analyzes signal characteristics based on window information and energy information of a PGF.

In operation 1210, the setting unit 574 determines whether the current signal is static based on the analyzed signal characteristics. When it is determined that the current signal is static, the setting unit 574 performs setting to reconstruct a parameter of an EF using linear regression analysis in operation 1220 and to perform regression analysis using K PGFs in operation 1230. When it is determined that the current signal is not static in operation 1210, the setting unit 574 performs setting to reconstruct the parameter of the EF using non-linear regression analysis in operation 1240 and to perform regression analysis using L PGFs in operation 1250. Accordingly, K may be an integer that is greater than L. Since a static audio signal has high correlation with its previous signal, it is desirable to refer to a longer interval of the previous signal than a dynamic audio signal in order to obtain an accurate and natural signal. In contrast, since the dynamic audio signal has low correlation with its previous signal, it is desirable to refer to a shorter interval of the previous signal than the static audio signal. However, there may be various methods to analyze signal characteristics and setting frame error concealment methods based on the analyzed signal characteristics without being limited to the above description and methods that can be easily construed from the present general inventive concept by those of ordinary skill in the art that are within the scope of the present general inventive concept.

The error concealment unit 580 conceals a frame error according to a regression analysis method that is set by the setting unit 574. Like the error concealment unit 290 illustrated in FIG. 2, the error concealment unit 580 may conceal a frame error by reconstructing a spectrum parameter of the EF from spectrum parameters of the PGF using regression analysis. The reconstructed spectrum parameter is provided to the filter bank 560 of the decoding unit 520 and the filter bank 560 reconstructs an audio signal of the EF using the reconstructed spectrum parameter of the EF like when it reconstructs the audio signal of the EF using spectrum parameters of a GF. However, when MDCT parameters of the PGF are decoded for each sub band of a frequency band, the error concealment unit 580 may also reconstruct the parameter of the EF from the parameters of the PGF for each sub band.

Hereinafter, the operation of the error concealment unit 580 according to another embodiment of the present general inventive concept will be described with reference to FIG. 5. The error concealment unit 580 illustrated in FIG. 5 predicts the spectrum parameter of the EF from the spectrum parameters of the PGF using regression analysis in a similar manner to a process in which the excitation signal reconstruction unit 292 of FIG. 3A and the LSP reconstruction unit 294 of FIG. 3B predict the spectrum parameter of the EF from the spectrum parameters of the PGF using regression analysis and thus a detailed description of the operation of the error concealment unit 580 will be omitted.

The operation of an audio decoding apparatus 600 including a frame error concealment apparatus (unit) 630 according to another embodiment of the present general inventive concept will be described with reference to FIG. 6. According to another embodiment of the present general inventive concept, the audio decoding apparatus 600 decodes a bitstream composed of a plurality of layers. Like in Bit Sliced Arithmetic Coding (BSAC), when a bitstream is composed of a plurality of layers and a frequency band is assigned to each of the layers, good layers of the bitstream, which precede a layer having an error (which will be referred to as an error layer), can be reconstructed. Thus, according to another embodiment of the present general inventive concept, even when an error is generated in a frame, information reconstructed prior to the generation of the error can be detected, thereby improving sound quality.

Figure 6:
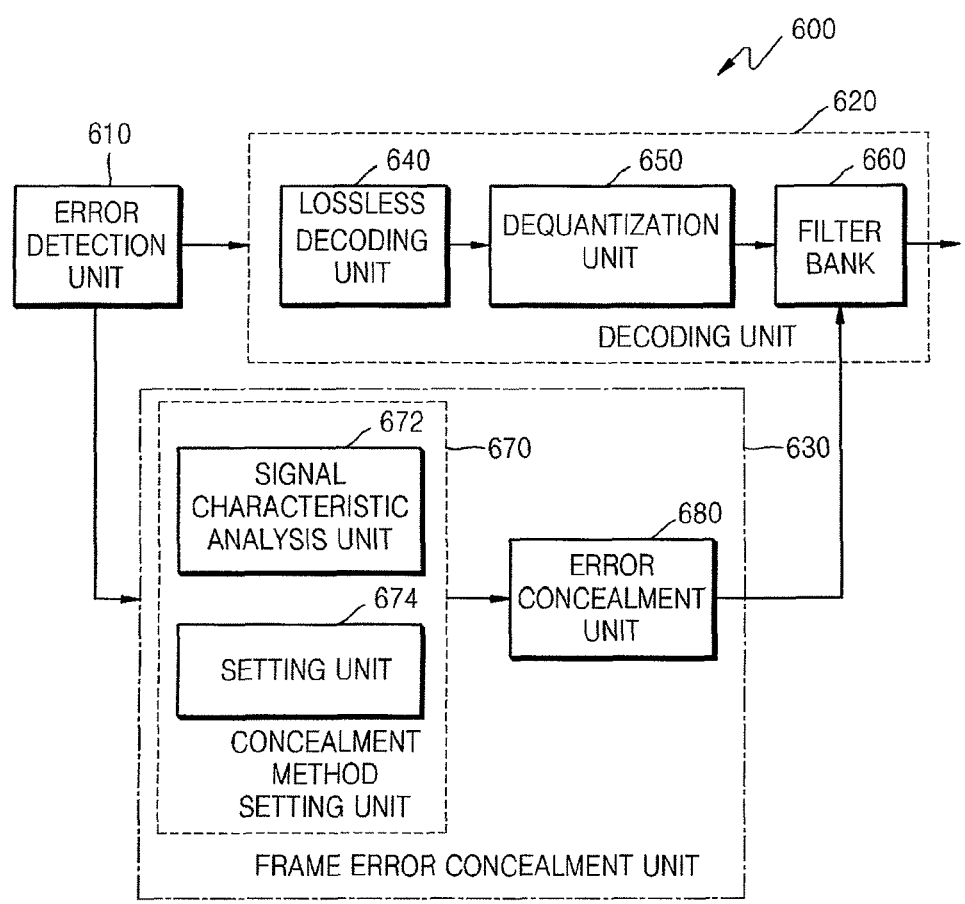
FIG. 6 is a block diagram of an audio decoding apparatus illustrating a frame error concealment apparatus according to another embodiment of the present general inventive concept.

FIG. 6 is a block diagram illustrating the audio decoding apparatus 600 including the frame error concealment apparatus 630 according to another embodiment of the present general inventive concept. The audio decoding apparatus 600 includes an error detection unit 610, a decoding unit 620, and a frame error concealment unit 630. The decoding unit 620 includes a lossless decoding unit 640, a dequantization unit 650, and a filter bank 660. The frame error concealment unit 630 includes a concealment method setting unit 670 and an error concealment unit 680. The concealment method setting unit 670 includes a signal characteristic analysis unit 672 and a setting unit 674.

Since the structure of the audio decoding apparatus 600 illustrated in FIG. 6 is similar to the structure of the audio decoding apparatus 500 illustrated in FIG. 5, the following description will be focused on the difference between the audio decoding apparatus 600 and the audio decoding apparatus 500.

The error detection unit 610 detects an EF from a transmitted bitstream and detects the position of an error in the ER This is because when the bitstream has a layered structure, the decoding unit 620 can normally decode a previous good layer (PGL) that precedes the position of the error.

The decoding unit 620 reconstructs spectrum parameters of a given GF or a good layer and reconstructs an audio signal of a frame from the reconstructed spectrum parameters. The lossless decoding unit 640 performs lossless decoding with respect to a bitstream corresponding to a GF or a good layer of an EF using arithmetic decoding and the dequantization unit 650 dequantizes the bitstream, thereby reconstructing a spectrum parameter. The filter bank 660 performs inverse MDCT on the reconstructed spectrum parameter, thereby reconstructing an audio signal of a time domain.

The frame error concealment unit 630 receives a layer including the position of an error and its following layer included in the EF from the error detection unit 610 and conceals the error.

According to another embodiment of the present general inventive concept, the signal characteristic analysis unit 660 analyzes signal characteristics based on information about a PGL preceding a layer including the position of an error as well as information about a PGF. The information about the PGF or the PGL may include attack signal information, window information, and energy information previously described with reference to FIG. 5.

The setting unit 670 sets a regression analysis method to conceal a frame error based on the signal characteristics analyzed by the signal characteristic analysis unit 660. The detailed operation of the setting unit 670 is similar to that of the setting unit 570 illustrated in FIG. 5 and thus will not be described.

The error concealment unit 680 conceals the error of a frame according to the regression analysis method set by the setting unit 670. The error concealment unit 680 reconstructs spectrum parameters of an error layer and its following layer in the EF using spectrum parameters of a PGL of the EF as well as spectrum parameters of a PGF. A detailed method to predict spectrum parameters of the current signal from spectrum parameters of a previous signal using regression analysis is similar to that of an LSP reconstruction unit 294 or an excitation signal reconstruction unit 292 illustrated in FIG. 3A and thus will not be described.

The spectrum parameters of the error layer and its following layer, which are reconstructed by the error concealment unit 680, are transmitted to the filter bank 650 of the decoding unit 660.

The filter bank 650 reconstructs an audio signal of the EF using spectrum parameters of a PGL of the EF, which have been normally decoded by the decoding unit 620, and the spectrum parameters of the error layer and its following layer, which have been reconstructed by the frame error concealment unit 630.

Like in BSAC, when a bitstream is composed of a plurality of layers, good layers of the bitstream, which precede an error layer, can be normally reconstructed by the decoding unit 620. Thus, the spectrum parameters of good layers preceding the error layer are reconstructed by the decoding unit 620 and the spectrum parameters of the error layer and its following layer are reconstructed by the frame error concealment unit 630, thereby accurately reconstructing an audio signal of the EF.

Hereinafter, a voice decoding method using frame error concealment according to an embodiment of the present general inventive concept will be described with reference to FIG. 7. FIG. 7 is a flowchart illustrating a voice decoding method using a frame error concealment method according to an embodiment of the present general inventive concept.

In operation 700, it is determined whether a frame of a bitstream has an error. If it is determined that no error is generated in operation 700, a voice signal of a GF having no error is reconstructed in operation 710. If it is determined that an error is generated in operation 700, signal characteristics are analyzed based on information about a PGF in operation 720. A regression analysis method to conceal the error is set based on the analyzed signal characteristics in operation 730. In operation 740, a gain parameter of the EF is reconstructed using gain parameters gp and gc of the PGF using the set regression analysis method. In operation 745, an excitation signal of the EF is reconstructed using the reconstructed gain parameter. In operation 750, an LSP parameter of the EF is reconstructed from an LSP parameter of the PGF using the set concealment method. In operation 760, a voice signal of the EF is reconstructed using the reconstructed excitation signal and the reconstructed LSP parameter.

Hereinafter, signal characteristic analysis (operation 720) and concealment method setting (operation 730) illustrated in FIG. 7 will be described in detail with reference to FIG. 8. FIG. 8 is a detailed flowchart illustrating operation 720 and operation 730 illustrated in FIG. 7.

In operation 800, signal characteristics are analyzed based on information about the PGF. In operation 810, it is determined whether the current signal is silence based on the analyzed signal characteristics. When it is determined that the current signal is silence in operation 810, setting is performed to reconstruct a parameter of the EF using linear regression analysis in operation 820 and to perform regression analysis by referring to M PGFs in operation 830. When it is determined that the current signal is not silence in operation 810, setting is performed to reconstruct the parameter of the EF using non-linear regression analysis in operation 840. In operation 850, it is determined whether the current signal is voiced sound. When it is determined that the current signal is voiced sound, setting is performed to perform regression analysis by referring to parameters of M PGFs in operation 860. When it is determined that the current signal is not voiced sound in operation 850, setting is performed to perform regression analysis by referring to N PGFs in operation 870. Here, M may be an integer that is greater than N. Since voiced sound has high correlation with a previous signal, it is desirable to refer to a longer interval of the previous signal than with unvoiced sound in order to obtain an accurate and natural signal. In contrast, since unvoiced sound has low correlation with a previous signal, it is desirable to refer to a shorter interval of the previous signal than in the case of voiced sound.

Figure 9:
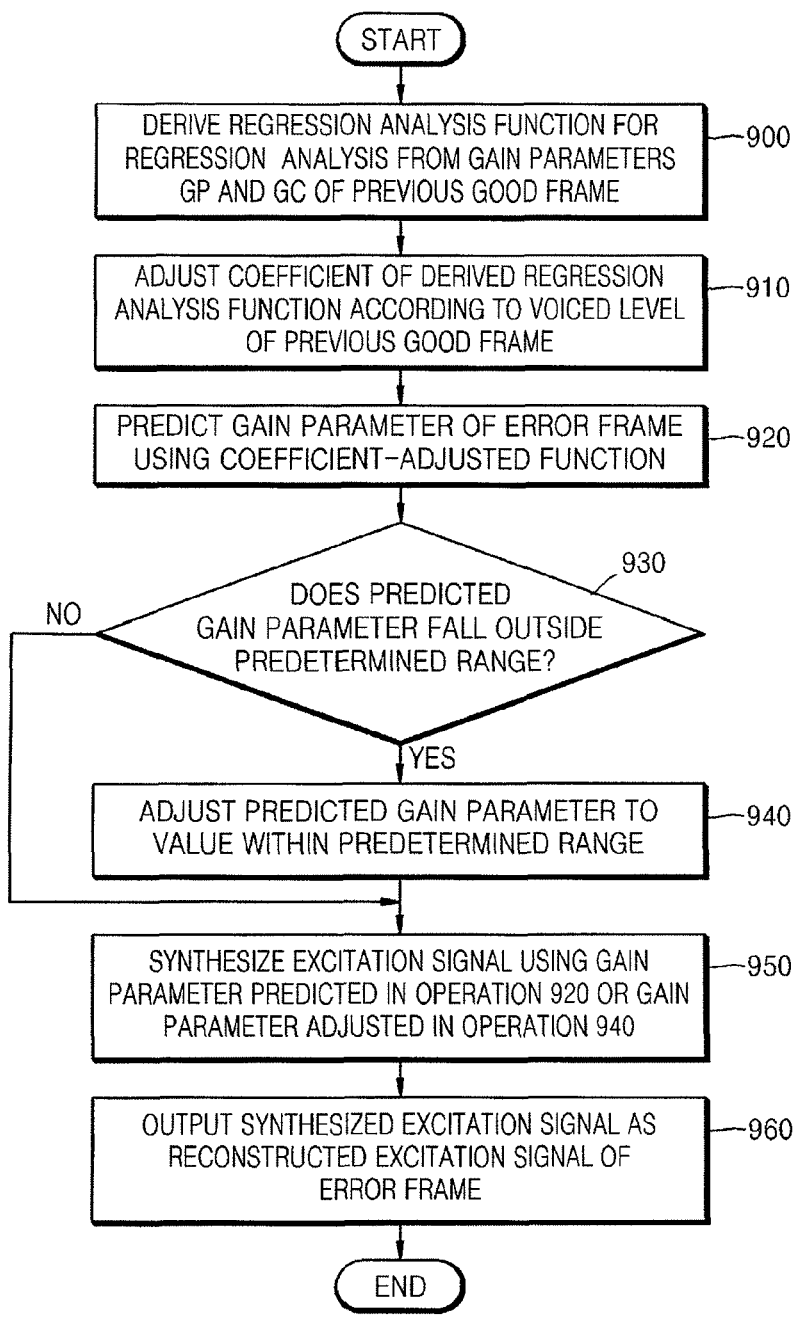
FIG. 9 is a detailed flowchart illustrating excitation signal reconstruction illustrated in FIG. 7.

Hereinafter, excitation signal reconstruction (operation 740) illustrated in FIG. 7 will be described in detail with reference to FIG. 9. FIG. 9 is a detailed flowchart illustrating operation 740 illustrated in FIG. 7.

In operation 900, a function is derived from the gain parameters gp and gc of the PGF by using regression analysis. In operation 910, a coefficient of the derived function is adjusted according to a voiced level of the PGF. In operation 920, a gain parameter of the EF is predicted using the coefficient-adjusted function. In operation 930, it is determined whether the predicted gain parameter falls outside a predetermined range. When it is determined that the predicted gain parameter falls outside the predetermined range in operation 930, the predicted gain parameter is adjusted to a value within the predetermined range in operation 940. When it is determined that the predicted gain parameter does not fall outside the predetermined range in operation 930, operation 950 is performed. In operation 950, an excitation signal is synthesized using the gain parameter predicted in operation 920 or the gain parameter adjusted in operation 940. The synthesized excitation signal is output as a reconstructed excitation signal of the EF in operation 960.

Figure 10:
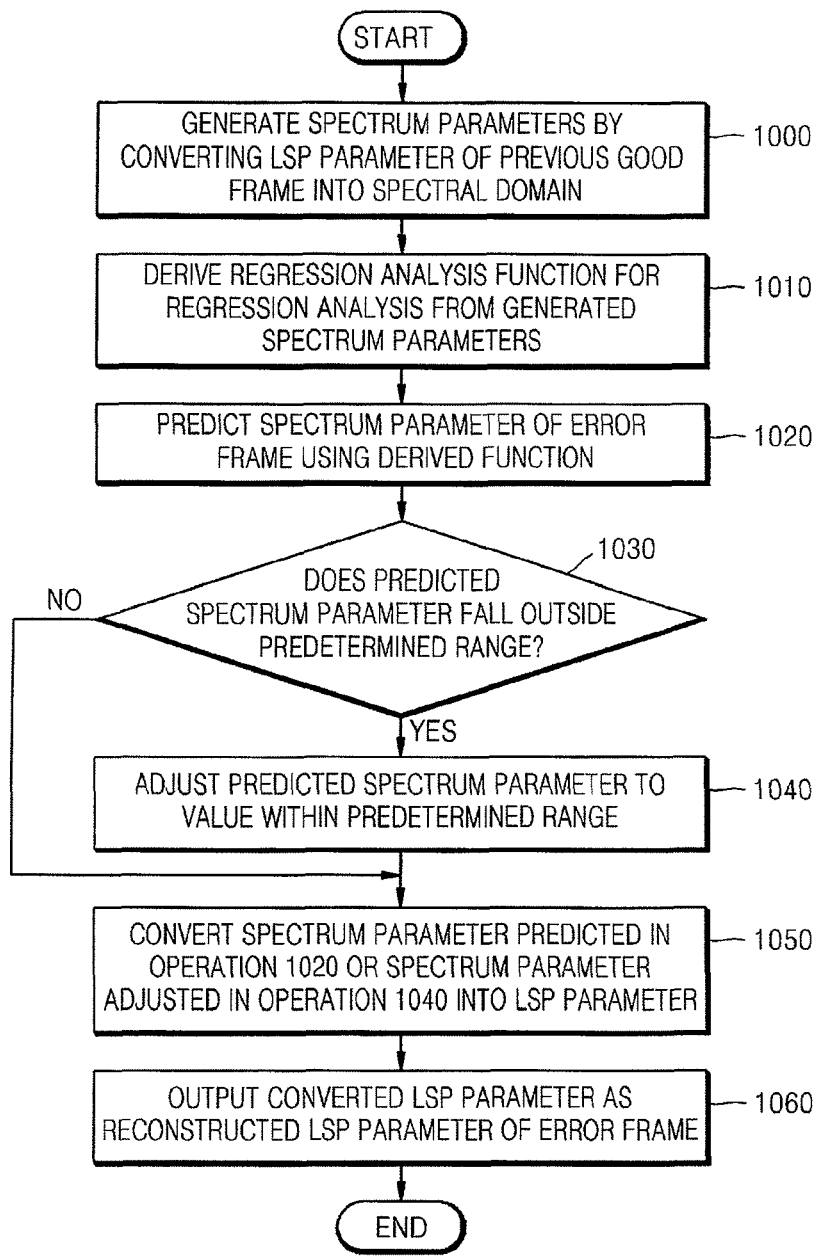
FIG. 10 is a detailed flowchart illustrating LSP parameter reconstruction illustrated in FIG. 7.

Hereinafter, LSP parameter reconstruction (operation 750) illustrated in FIG. 7 will be described in detail. FIG. 10 is a detailed flowchart illustrating operation 750 illustrated in FIG. 7.

In operation 1000, spectrum parameters are generated by converting an LSP parameter of the PGF into a spectral domain. In operation 1010, a function is derived from the generated spectrum parameters using regression analysis. In operation 1020, a spectrum parameter of the EF is predicted using the derived function. In operation 1030, it is determined whether the predicted spectrum parameter falls outside a predetermined range. When it is determined that the predicted spectrum parameter falls outside the predetermined range in operation 1030, the predicted spectrum parameter is adjusted to a value within the predetermined range in operation 1040. When it is determined that the predicted spectrum parameter does not fall outside the predetermined range in operation 1030, operation 1050 is performed. In operation 1050, the spectrum parameter predicted in operation 1020 or the spectrum parameter adjusted in operation 1040 is converted into an LSP parameter. In operation 1060, the converted LSP parameter is output as a reconstructed LSP parameter of the EF.

Hereinafter, an audio decoding method using frame error concealment according to an embodiment of the present general inventive concept will be described with reference to FIG. 11. FIG. 11 is a flowchart illustrating an audio decoding method using a frame error concealment method according to an embodiment of the present general inventive concept.

In operation 1100, it is determined whether a frame of a bitstream has an error. If it is determined that no error is generated in operation 1100, a spectrum parameter of a GF having no error is decoded in operation 1105. In operation 1110, an audio signal of the GF is reconstructed using the decoded spectrum parameter. If it is determined that an error is generated in operation 1100, signal characteristics are analyzed based on information about a PGF in operation 1120. A regression analysis method to conceal the error is set based on the analyzed signal characteristics in operation 1130. In operation 1140, a spectrum parameter of the EF is reconstructed using spectrum parameters of the PGF using the set regression analysis method. In operation 1150, an audio signal of the EF is reconstructed using the reconstructed spectrum parameter.

Hereinafter, signal characteristic analysis (operation 1120) and concealment method setting (operation 1130) illustrated in FIG. 11 will be described in detail with reference to FIG. 12. FIG. 12 is a detailed flowchart illustrating operation 1120 and operation 1130 illustrated in FIG. 11.

In operation 1200, signal characteristics are analyzed based on information about the PGF. In operation 1210, it is determined whether the current signal is static based on the analyzed signal characteristics. If it is determined that the current signal is static in operation 1210, setting is performed to reconstruct a parameter of the EF using linear regression analysis in operation 1220 and regression analysis can be performed by referring to K PGFs in operation 1230. If it is determined that the current signal is not static in operation 1210, setting is performed to reconstruct the parameter of the EF using non-linear regression analysis in operation 1240 and regression analysis can be performed by referring to L PGFs in operation 1250. Here, K may be an integer that is greater than L. Since a static audio signal has high correlation with its previous signal, it is desirable to refer to a longer interval of the previous signal than with a dynamic audio signal in order to obtain an accurate and natural signal. In contrast, since the dynamic audio signal has low correlation with its previous signal, it is desirable to refer to a shorter interval of the previous signal than with the static audio signal.

Hereinafter, an audio decoding method using frame error concealment according to another embodiment of the present general inventive concept will be described with reference to FIG. 13. FIG. 13 is a flowchart illustrating an audio decoding method using a frame error concealment method according to another embodiment of the present general inventive concept.

In operation 1300, it is determined whether a frame of a bitstream has an error. If it is determined that no error is generated in operation 1300, spectrum parameters of a GF having no error are reconstructed in operation 1310. In operation 1320, an audio signal of the GF is reconstructed using the reconstructed spectrum parameters.

If it is determined that an error is generated in operation 1300, the position of the error in the frame is detected in operation 1330. This is because when the bitstream has a layered structure, a PGL that precedes the position of the error can be decoded normally. Thus, spectrum parameters of the PGL that precedes the position of the error in the frame are decoded in operation 1340. In operation 1350, signal characteristics are analyzed based on information about the PGF and information about the PGL. In operation 1360, a regression analysis method to reconstruct spectrum parameters of an error layer including the position of the error and its following layer is set based on the analyzed signal characteristics. In operation 1370, the spectrum parameters of the error layer and its following layer are reconstructed using the spectrum parameters of the PGF and the spectrum parameters of the PGL using the set regression analysis method. In operation 1370, an audio signal of the EF is reconstructed using the spectrum parameters of the PGL, which are decoded in operation 1340, and the spectrum parameters of the error layer and its following layer, which are decoded in operation 1370.

As described above, in a decoding method and apparatus using frame error concealment according to embodiments of the present general inventive concept, signal characteristics of an EF are analyzed, an optimized regression analysis method to reconstruct an EF is set based on the analyzed signal characteristics, and parameters of the EF are reconstructed using the set regression analysis method, thereby accurately reconstructing the EF and thus minimizing sound quality degradation caused by a frame error.

Moreover, in a decoding method and apparatus using frame error concealment according to another embodiment of the present general inventive concept, when a bitstream has a layered structure, instead of reconstructing the entire EF according to frame error concealment, layers preceding a layer having an error are reconstructed normally and the layer having an error and its following layer are reconstructed according to frame error concealment by referring to reconstructed parameters of a PGL, thereby accurately reconstructing the EF and thus minimizing sound quality degradation caused by the frame error.

The present general inventive concept can also be embodied as code that is readable by a computer on a computer-readable medium. The computer-readable medium includes all kinds of recording devices storing data that is readable by a computer system. Examples of the computer-readable medium include read-only memory (ROM), random access memory (RAM), CD-ROMs, magnetic tapes, floppy disks, optical data storage devices, and carrier waves such as data transmission over the Internet. The computer-readable medium can also be distributed over network coupled computer systems so that the computer readable code is stored and executed in a distributed fashion. Also, functional programs, code, and code segments to accomplish the present general inventive concept can be easily construed by programmers skilled in the art to which the general inventive concept pertains.

As discussed above, in a frame error concealment method and apparatus according to various embodiments of the present general inventive concept, a frame error is concealed according to a concealment method that is set based on signal characteristics, thereby accurately reconstructing an error frame.

Moreover, when a bitstream has a layered structure, a previous good layer preceding an error layer having an error is decoded normally and the error layer and its following layer are reconstructed by referring to decoding results of a previous good frame and the previous good layer, thereby accurately reconstructing the error layer.

Furthermore, in a frame error concealment method and apparatus according to various embodiments of the present general inventive concept, since a frame error is concealed using regression analysis, an error frame or an error layer can be accurately predicted by finely considering changes of a previous good frame and a previous good layer.

Additionally, in a decoding method and apparatus, an error frame is concealed using a frame error concealment method and apparatus according to various embodiments of the present general inventive concept, thereby minimizing sound quality degradation caused by a frame error.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A packet loss concealment method, comprising:
receiving, by at least one processor, a bitstream transmitted from an encoding end;
when an error occurs in a current frame, determining, performed by the at least one processor, how many previous good frames are to be referred to in a linear regression analysis, based on one or more signal characteristics;
performing, by the at least one processor, the linear regression analysis by referring to previous good frames in response to the determining how many previous good frames are to be referred to;
predicting, by the at least one processor, at least one parameter of the current frame based on the performing the linear regression analysis;
concealing, by the at least one processor, the current frame based on the predicted at least one parameter; and
generating, by the at least one processor, an output signal including the concealed current frame.

2. The method of claim 1, wherein the one or more signal characteristics are determined based on information about at least one previous good frame.

3. The method of claim 1, wherein the one or more signal characteristics are determined based on energy information of at least one previous good frame.

4. The method of claim 1 further comprising setting an interval to extract one or more parameters of at least one previous good frame to be referred to.

5. The method of claim 1 further comprising adjusting a value calculated from the predicted at least one parameter within a predetermined range.

6. The method of claim 1, wherein the at least one parameter is predicted from one or more parameters of at least one previous good frame using the linear regression analysis.

7. The method of claim 6, wherein a regression analysis function to predict the at least one parameter is derived from the one or more parameters of at least one previous good frame using the linear regression analysis and the at least one parameter is predicted using the derived regression analysis function.

8. The method of claim 7, wherein an adjustment function to adjust the predicted parameter is set based on one or more signal characteristics, to adjust a coefficient of the derived function using the set adjustment function and the at least one parameter is predicted using the coefficient-adjusted function.

9. The method of claim 8, wherein the function whose coefficient is adjusted using the set adjustment function is a function to predict a parameter associated with energy information.

10. The method of claim 1, wherein a number of previous good frames referred to for the linear regression analysis is determined, based on one or more signal characteristics of a decoded signal.

11. The method of claim, 1, wherein the one or more signal characteristics comprise energy information.

12. A decoding apparatus, comprising:
a receiver configured to receive a bitstream transmitted from an encoding end; and
at least one processing device configured to:
decode a frame having no error from the bitstream;
when an error occurs in a current frame, determine how many previous good frames are to be referred to in a regression analysis, based on one or more signal characteristics;
perform the regression analysis on previous good frames in response to a result of determining how many previous good frames are to be referred to;
predict at least one parameter of the current frame based on a result of performing the regression analysis;
conceal the current frame based on the predicted at least one parameter; and generate an output signal including the concealed current frame.

13. The apparatus of claim 12, wherein the one or more signal characteristics are determined based on energy information of at least one previous good frame.

14. The apparatus of claim 12, wherein the at least one processing device is further configured to set an interval to extract one or more parameters of at least one previous good frame to be referred to.

15. The apparatus of claim 12, wherein the at least one processing device is further configured to adjust a value calculated from the predicted at least one parameter within a predetermined range.

16. The apparatus of claim 12, wherein a regression analysis function to predict the at least one parameter is derived from one or more parameters of at least one previous good frame using the regression analysis and the at least one parameter is predicted using the derived regression analysis function.

17. The apparatus of claim 16, wherein an adjustment function to adjust the predicted parameter is set based on one or more signal characteristics, to adjust a coefficient of the derived function using the set adjustment function and the at least one parameter is predicted using the coefficient-adjusted function.

18. The apparatus of claim 17, wherein the function whose coefficient is adjusted using the set adjustment function is a function to predict a parameter associated with energy information.

19. The apparatus of claim 12, wherein a number of previous good frames referred to for the regression analysis is determined, based on one or more signal characteristics of a decoded frame.

20. The apparatus of claim 12, wherein the regression analysis is a linear regression analysis.

* * * * *